US012278748B2

(12) United States Patent
Manolakos et al.

(10) Patent No.: US 12,278,748 B2
(45) Date of Patent: Apr. 15, 2025

(54) DETAILED WARNING AND ERROR REPORTING RELATED TO UL PRS TRANSMISSION PROPERTIES

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Sven Fischer, Nuremberg (DE); Wanshi Chen, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/021,816

(22) Filed: Sep. 15, 2020

(65) Prior Publication Data

US 2021/0112474 A1 Apr. 15, 2021

Related U.S. Application Data

(60) Provisional application No. 62/915,551, filed on Oct. 15, 2019.

(51) Int. Cl.
*H04L 43/08* (2022.01)
*H04L 5/00* (2006.01)
(Continued)

(52) U.S. Cl.
CPC .......... *H04L 43/0864* (2013.01); *H04L 5/005* (2013.01); *H04L 25/0224* (2013.01);
(Continued)

(58) Field of Classification Search
None
See application file for complete search history.

(56) References Cited

U.S. PATENT DOCUMENTS

2015/0031307 A1* 1/2015 Gao .................. H04L 43/16
455/67.11
2015/0263837 A1 9/2015 Patel et al.
(Continued)

FOREIGN PATENT DOCUMENTS

CN 102651907 A 8/2012
CN 103209475 A 7/2013
(Continued)

OTHER PUBLICATIONS

International Search Report and Written Opinion—PCT/US2020/051073—ISA/EPO—Dec. 8, 2020.
(Continued)

*Primary Examiner* — Yemane Mesfin
*Assistant Examiner* — Jeff Banthrongsack
(74) *Attorney, Agent, or Firm* — Procopio, Cory, Hargreaves & Savitch LLP

(57) ABSTRACT

A user equipment (UE) receives reference signal resource configuration for transmitting reference signals for positioning from, e.g., a location server. The UE transmits or attempts to transmit reference signals for positioning to one or more transmission-reception points, such as a gNB. The UE may, however, may be unable to transmit reference signals in accordance with the reference signal resource configuration. For example, the UE may be unable to transmit the reference signals or may transmit the reference signals with lower power or a different spatial relation than configured. The UE may provide a reference signal transmission report indicating that the reference signals were not transmitted according to the reference signal resource configuration. The reference signal transmission report may
(Continued)

indicate how the reference signal transmission differs from the reference signal resource configuration and may indicate the reasons that the reference signal transmission differs from the reference signal resource configuration.

24 Claims, 10 Drawing Sheets

(51) Int. Cl.
| | |
|---|---|
| *H04L 25/02* | (2006.01) |
| *H04L 43/0864* | (2022.01) |
| *H04W 24/10* | (2009.01) |
| *H04W 36/00* | (2009.01) |
| *H04W 36/32* | (2009.01) |
| *H04W 76/18* | (2018.01) |
| *H04W 76/28* | (2018.01) |

(52) U.S. Cl.
CPC ..... *H04W 24/10* (2013.01); *H04W 36/00692* (2023.05); *H04W 36/322* (2023.05); *H04W 76/18* (2018.02); *H04W 76/28* (2018.02)

(56) References Cited

U.S. PATENT DOCUMENTS

| | | | |
|---|---|---|---|
| 2016/0088634 A1* | 3/2016 | Wang | H04B 1/3805 370/336 |
| 2016/0192376 A1* | 6/2016 | Lee | H04W 48/20 370/252 |
| 2018/0020423 A1* | 1/2018 | Wang | H04L 5/0048 |
| 2018/0049152 A1* | 2/2018 | Xiao | G01S 5/0215 |
| 2018/0220392 A1* | 8/2018 | Ly | H04L 5/005 |

FOREIGN PATENT DOCUMENTS

| | | |
|---|---|---|
| GB | 2582788 A | 10/2020 |
| WO | 2019027680 A2 | 2/2019 |

OTHER PUBLICATIONS

Spirent Communications: "Setting Response Time in ECID Test Cases", 3GPP Draft, 37571-1_CR0010_(REL-9)_R5-121129, 3GPP TSG RAN WG5 Meeting #55, 3rd Generation Partnership-Project (3GPP), Mobile Competence Centre, 650, Route Des Lucioles, F-06921, Sophia-Antipolis Cedex, France, vol. RAN WG5, No. Prague, Czech, May 21, 2012-May 25, 2012, Jun. 8, 2012 (Jun. 8, 2012), XP051638388, 16 Pages, Retrieved from the Internet: URL: http://www.3gpp.org/ftp/tsg%5Fran/TSG%5FRAN/TSGR%5F56/Docs/RP%2D120649%2Ezip [retrieved on Jun. 8, 2012] Paragraph [8.1.1.4]—Paragraph [8.1.2.3].

Spirent Communications: "Setting ResponseTime in ECID Test Cases", 3GPP TSG RAN WG5 Meeting #55, R5-121129, Prague, Czech, May 21, 2012-May 25, 2012, 16 Pages.

\* cited by examiner

DETAILED WARNING AND ERROR REPORTING RELATED TO UL PRS TRANSMISSION PROPERTIES

CLAIM OF PRIORITY UNDER 35 U.S.C. § 119

This application claims under 35 USC § 119 the benefit of and priority to U.S. Provisional Application No. 62/915,551, filed Oct. 15, 2019, and entitled "DETAILED WARNING AND ERROR REPORTING RELATED TO UL PRS TRANSMISSION PROPERTIES," which is assigned to the assignee hereof and is incorporated herein by reference in its entirety.

BACKGROUND OF THE DISCLOSURE

Field of the Disclosure

Various aspects described herein generally relate to wireless communication systems, and more particularly, to sounding reference signal (SRS) and resource set configuration for positioning.

Description of the Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device can also be configured to report time of arrival (ToA) of RF signals.

With OTDOA, when the mobile device reports the time difference of arrival (TDOA) between two network nodes, the location of the mobile device is then known to lie on a hyperbola with the locations of the two network nodes as the foci. Measuring TDOAs between multiple pairs of network nodes allows solving for the mobile device's position as intersections of the hyperbolas.

Round trip time (RTT) is another technique for determining a position of a mobile device. RTT is a two-way messaging technique (network node→mobile device and mobile device→network node), with both the mobile device and the network node reporting their receive-transmit (Rx Tx) time differences to the entity such as an eSMLC or LMF that computes the mobile device position. This allows for computing the back-and-forth flight time between the mobile device and the network node. The location of the mobile device is then known to lie on a circle with center at the network node's position. Reporting RTTs with multiple network nodes allows the positioning entity to solve for the mobile device's position as intersections of the circles.

SUMMARY

A user equipment (UE) receives reference signal resource configuration for transmitting reference signals for positioning from, e.g., a location server. The UE transmits or attempts to transmit reference signals for positioning to one or more transmission-reception points, such as a gNB. The UE may, however, may be unable to transmit reference signals in accordance with the reference signal resource configuration. For example, the UE may be unable to transmit the reference signals or may transmit the reference signals with lower power or a different spatial relation than configured. The UE may provide a reference signal transmission report indicating that the reference signals were not transmitted according to the reference signal resource configuration. The reference signal transmission report may indicate how the reference signal transmission differs from the reference signal resource configuration and may indicate the reasons that the reference signal transmission differs from the reference signal resource configuration.

In one implementation, a method of supporting positioning of a user equipment (UE) performed by the UE, includes receiving at least one reference signal resource configuration for transmitting reference signals for positioning; transmitting or attempting to transmit the reference signals for positioning to one or more transmission-reception points; and sending a reference signal transmission report to a network entity, the reference signal transmission report indicating that one or more of the reference signals were not transmitted according to the at least one reference signal resource configuration.

In one implementation, a user equipment (UE) capable of supporting positioning, includes an external interface for receiving and sending messages; at least one memory; and at least one processor coupled to the external interface and the at least one memory, the at least one processor configured to: receive at least one reference signal resource configuration for transmitting reference signals for positioning; transmit or attempting to transmit the reference signals for positioning to one or more transmission-reception points; and send a reference signal transmission report to a network entity, the reference signal transmission report indicating that one or more of the reference signals were not transmitted according to the at least one reference signal resource configuration.

In one implementation, a user equipment (UE) capable of supporting positioning, includes means for receiving at least one reference signal resource configuration for transmitting reference signals for positioning; means for transmitting or attempting to transmit the reference signals for positioning to one or more transmission-reception points; and means for sending a reference signal transmission report to a network entity, the reference signal transmission report indicating that one or more of the reference signals were not transmitted according to the at least one reference signal resource configuration.

In one implementation, a non-transitory storage medium including program code stored thereon, the program code is operable to configure at least one processor in a user equipment (UE) capable of supporting positioning, includes program code to receive at least one reference signal resource configuration for transmitting reference signals for positioning; program code to transmit or attempting to transmit the reference signals for positioning to one or more transmission-reception points; and program code to send a reference signal transmission report to a network entity, the reference signal transmission report indicating that one or more of the reference signals were not transmitted according to the at least one reference signal resource configuration.

In one implementation, a method of supporting positioning of a user equipment (UE) performed by a location server, includes sending to the UE at least one reference signal resource configuration for transmitting reference signals for positioning; receiving reference signal measurements from one or more transmission-reception points, the reference signal measurements providing measurements of any reference signals transmitted by the UE; and receiving a reference signal transmission report from the UE, the reference signal transmission report indicating that one or more of the reference signals were not transmitted according to the at least one reference signal resource configuration.

In one implementation, a location server capable of supporting positioning of a user equipment (UE), includes an external interface for receiving and sending messages; at least one memory; and at least one processor coupled to the external interface and the at least one memory, the at least one processor configured to: send to the UE at least one reference signal resource configuration for transmitting reference signals for positioning; receive reference signal measurements from one or more transmission-reception points, the reference signal measurements providing measurements of any reference signals transmitted by the UE; and receive a reference signal transmission report from the UE, the reference signal transmission report indicating that one or more of the reference signals were not transmitted according to the at least one reference signal resource configuration.

In one implementation, a location server capable of supporting positioning of a user equipment (UE), includes means for sending to the UE at least one reference signal resource configuration for transmitting reference signals for positioning; means for receiving reference signal measurements from one or more transmission-reception points, the reference signal measurements providing measurements of any reference signals transmitted by the UE; and means for receiving a reference signal transmission report from the UE, the reference signal transmission report indicating that one or more of the reference signals were not transmitted according to the at least one reference signal resource configuration.

In one implementation, a non-transitory storage medium including program code stored thereon, the program code is operable to configure at least one processor in a location server capable of supporting positioning of a user equipment (UE), includes program code to send to the UE at least one reference signal resource configuration for transmitting reference signals for positioning; program code to receive reference signal measurements from one or more transmission-reception points, the reference signal measurements providing measurements of any reference signals transmitted by the UE; and program code to receive a reference signal transmission report from the UE, the reference signal transmission report indicating that one or more of the reference signals were not transmitted according to the at least one reference signal resource configuration.

DETAILED DESCRIPTION

Figure 1:
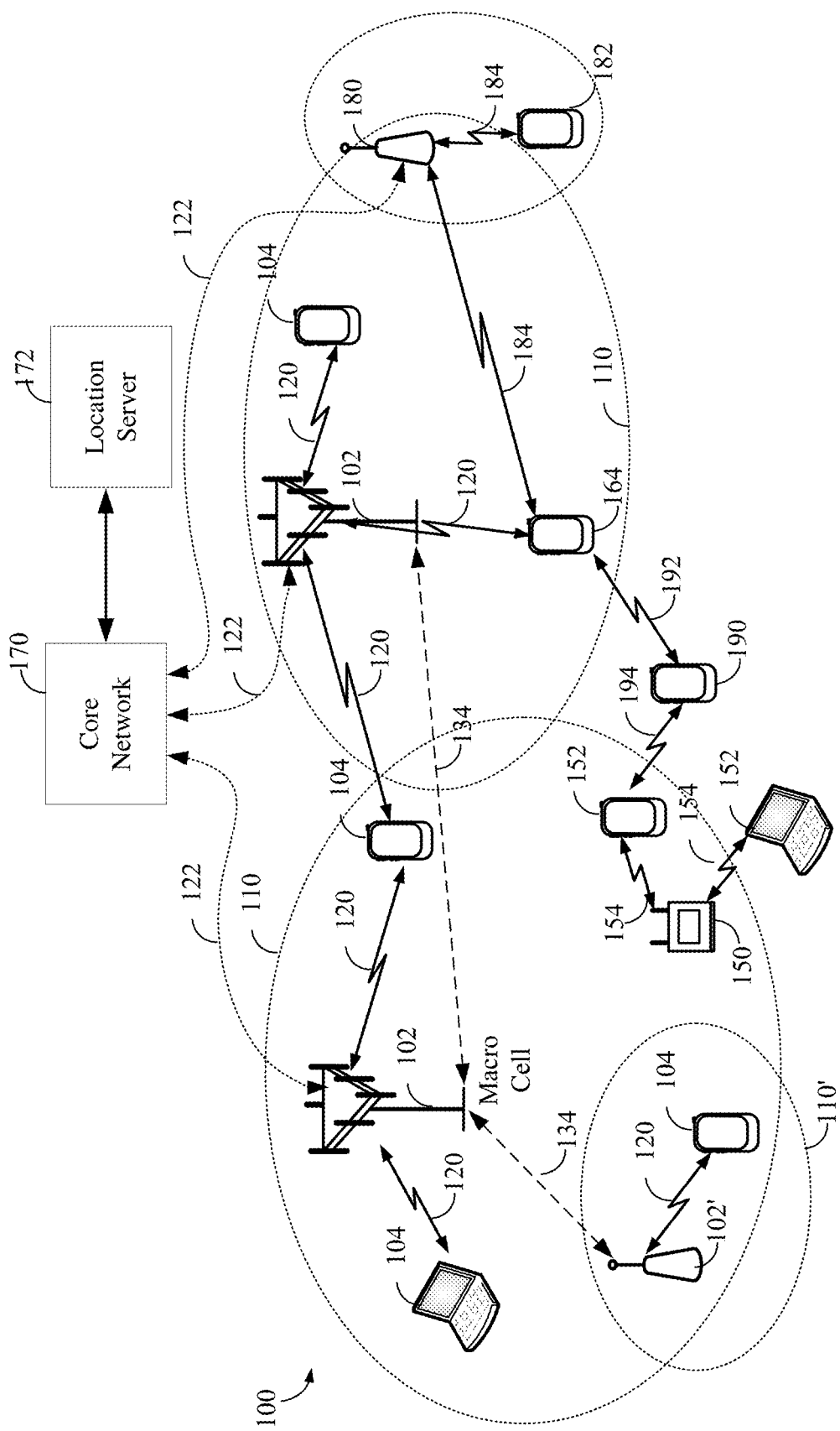
FIG. 1 illustrates an example of a wireless communications system that supports reference signal transmission reports by a user equipment (UE) in accordance with aspects of the present disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects" or "aspects of the disclosure" does not require that all aspects of the disclosure include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, various aspects may be described in terms of sequences of actions to be performed by, for example, elements of a computing device. Those skilled in the art will recognize that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure described herein may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a New Radio (NR) Node B (also referred to as a gNB or gNodeB), a base transceiver station, a radio base station, a radio transceiver, a transceiver function, a basic service set (BSS), an extended service set (ESS), a transmission-reception point (TRP), or some other suitable terminology. In addition, in some systems a base station may provide purely edge node signaling functions while in other systems it may provide additional control and/or network management functions.

A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cell base stations (high power cellular base stations) and/or small cell base stations (low power cellular base stations). The macro cell base stations may include eNBs where the wireless communications system 100 corresponds to an LTE network, gNBs where the wireless communications system 100 corresponds to a 5G network, or a combination thereof, and the small cell base stations may include femtocells, picocells, microcells, etc. The base stations 102 may be referred to herein as eNBs, gNBs, or transmission-reception points (TRPs).

The base stations 102 may collectively form a RAN and interface with a core network 170 (e.g., an Evolved Packet Core (EPC) or Next Generation Core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell base stations and macro cell base stations may be known as a heterogeneous network. A heterogeneous network may also include Home eNBs (HeNBs) and/or Home gNodeBs, which may provide service to a restricted group known as a closed subscriber group (CSG).

The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 2A:
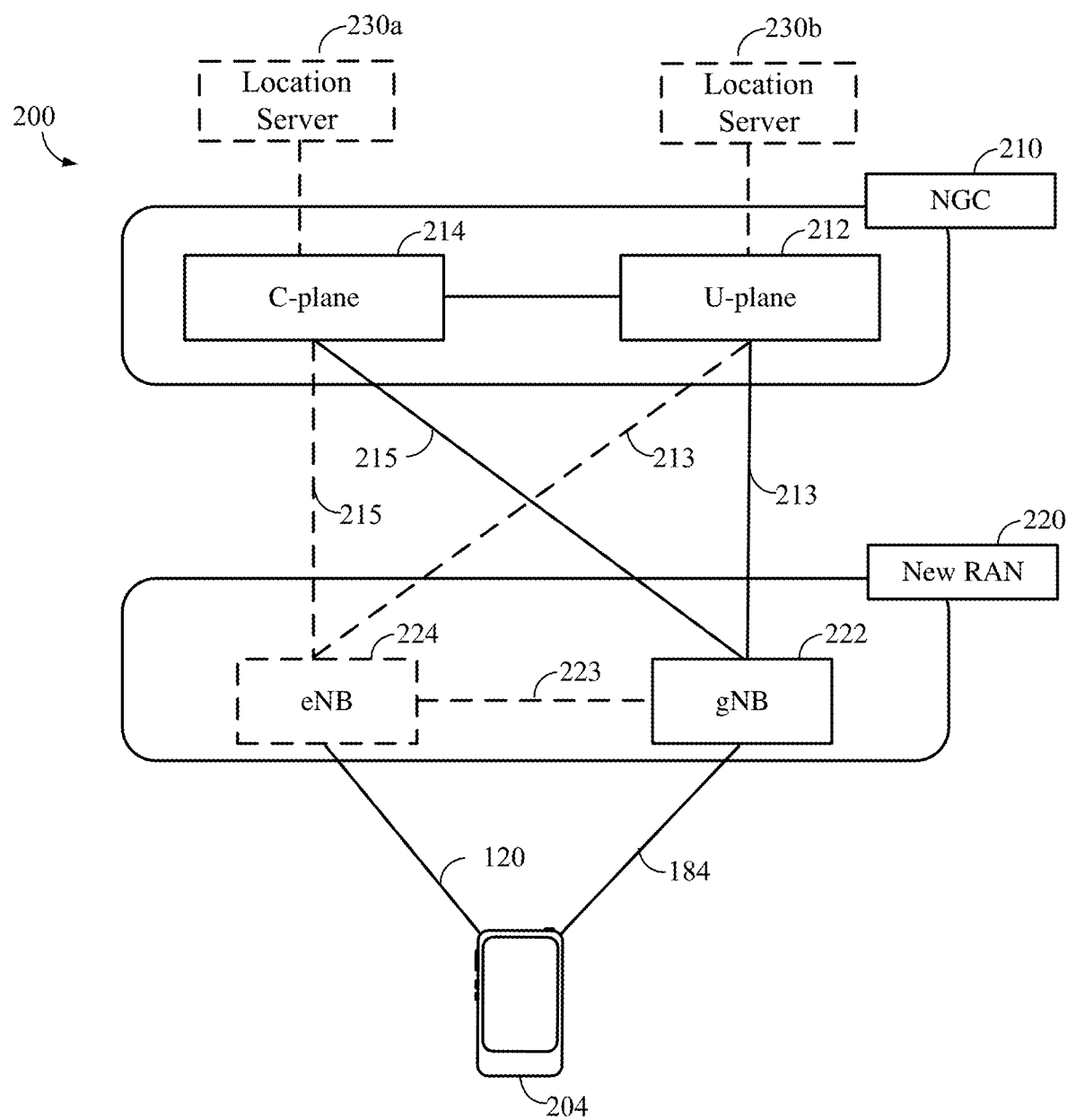
FIGS. 2A and 2B illustrate example wireless network structures, according to various aspects of the disclosure.

FIG. 2A illustrates an example wireless network structure 200. For example, a next generation core (NGC) 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to LMF 196), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
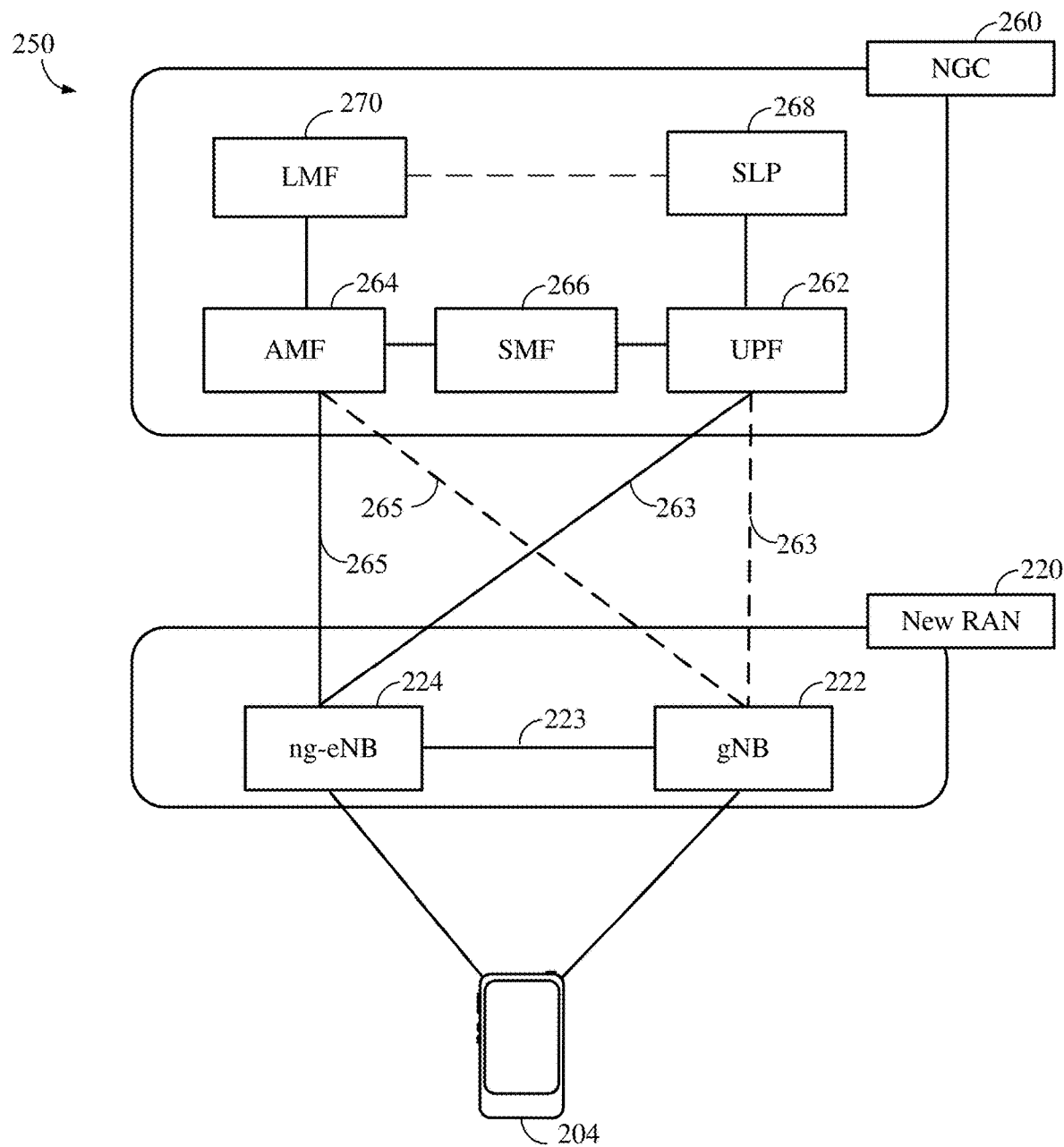

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SUPL Location Platform (SLP) 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 264 over the N2 interface and the UPF 262 over the N3 interface.

The functions of the AMF 264 include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and the location management function (LMF) 270 (which may correspond to LMF 196), as well as between the New RAN 220 and the LMF 270, evolved packet system (EPS) bearer identifier allocation for interworking with the EPS, and UE 204 mobility event notification. In addition, the AMF 264 also supports functionalities for non-Third Generation Partnership Project (3GPP) access networks.

Functions of the UPF 262 include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
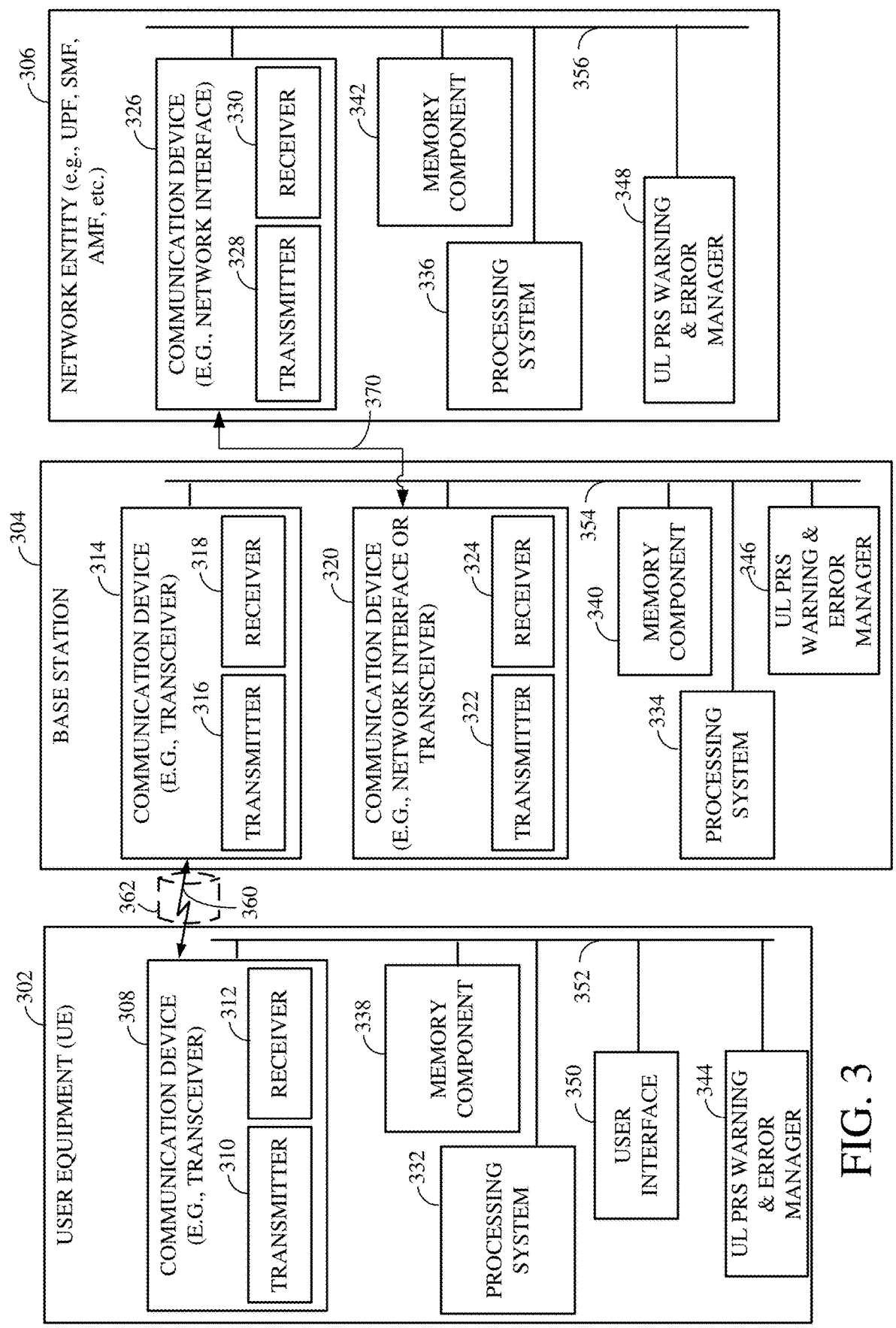
FIG. 3 is a simplified block diagram of several sample aspects of components that may be employed in communication nodes and configured to support communication as taught herein.

FIG. 3 illustrates several sample components (represented by corresponding blocks) that may be incorporated into a UE 302 (which may correspond to any of the UEs described herein), a base station 304 (which may correspond to any of the base stations, eNBs, gNBs, or TRPs, described herein), and a network entity 306 (which may correspond to or embody any of the network functions described herein, including the location server 230 and the LMF 270) to support the operations as disclosed herein. It will be appreciated that these components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 may include at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 may include at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the operations as disclosed herein. The UE 302 may include a processing system 332 for providing functionality relating to, for example, the UE operations as described herein and for providing other processing functionality. The base station 304 may include a processing system 334 for providing functionality relating to, for example, the base station operations described herein and for providing other processing functionality. The network entity 306 may include a processing system 336 for providing functionality relating to, for example, the network function operations described herein and for providing other processing functionality. In an aspect, the processing systems 332, 334, and 336 may include, for example, one or more general purpose processors, multi-core processors, ASICs, digital signal processors (DSPs), field programmable gate arrays (FPGA), or other programmable logic devices or processing circuitry. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for a radio resource control (RRC) layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304, and 306 may include UL PRS warning and error managers 344, 346, and 348 respectively. The UL PRS warning and error managers 344, 346, and 348 may be hardware circuits that are part of or coupled to the processing systems 332, 334, and 336, respectively, that, when executed, cause the apparatuses 302, 304, and 306 to perform the functionality described herein. Alternatively, the UL PRS warning and error managers 344, 346, and 348 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the UE 302 (e.g., by execution of appropriate code and/or by appropriate configuration of processor components). Similarly, some or all of the functionality represented by blocks 314, 320, 334, 340, and 346 may be implemented by processor and memory component(s) of the base station 304 (e.g., by execution of appropriate code and/or by appropriate configuration of processor components). Also, some or all of the functionality represented by blocks 326, 336, 342, and 348 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE, base station, network entity, etc., such as the processing systems 332, 334, 336, the communication devices 308, 314, 326, the UL PRS warning and error managers 344, 346, and 348, etc.

The UE 302 may transmit and receive messages via a wireless link 360 with the base station 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the base station 304 and the UE 302 for the medium 362.

As a particular example, the medium 362 may correspond to at least a portion of an unlicensed frequency band shared with another RAN and/or other APs and UEs. In general, the UE 302 and the base station 304 may operate via the wireless link 360 according to one or more radio access types, such as LTE, LTE U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE U" or "MuLTE-Fire."

The UE 302 and base station 304 may be configured to transmit and receive reference signals used for positioning, referred to as positioning reference signals (PRS). The DL PRS transmissions by the base station 304 may be configured for a UE to measure and report one or more report parameters (for example, report quantities) associated with positioning and location information. Similarly, the UL PRS transmissions by the UE 302, e.g., sounding reference signals (SRS) transmissions, may be configured for a base station to measure and report one or more report parameters (for example, report quantities) associated with positioning and location information for the UE. The PRS transmission and report parameter feedback may support various location services (for example, navigation systems and emergency communications). In some examples, the report parameters supplement one or more additional location systems supported by the UE 302 (such as global positioning system (GPS) technology).

A position estimation of a UE may be determined, e.g., by a location server, using measurements obtained from reference signals, e.g., PRS signals from one or more base stations, SRS signals from the UE or both PRS signals and SRS signals. For example, DL based positioning methods include DL Time Difference of Arrival (DL-TDOA), DL Angle of Departure (DL AoD), Enhanced Cell ID (ECID); UL based positioning methods include UL Time Difference of Arrival (UL-TDOA), UL Angle of Arrival (UL AoA), UL Relative Time of Arrival (UL-RTOA); and DL and UL based positioning methods include Round-Trip Time (RTT) with one or more neighboring base stations (multi-RTT).

A position estimate (e.g., for a UE 104) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 4:
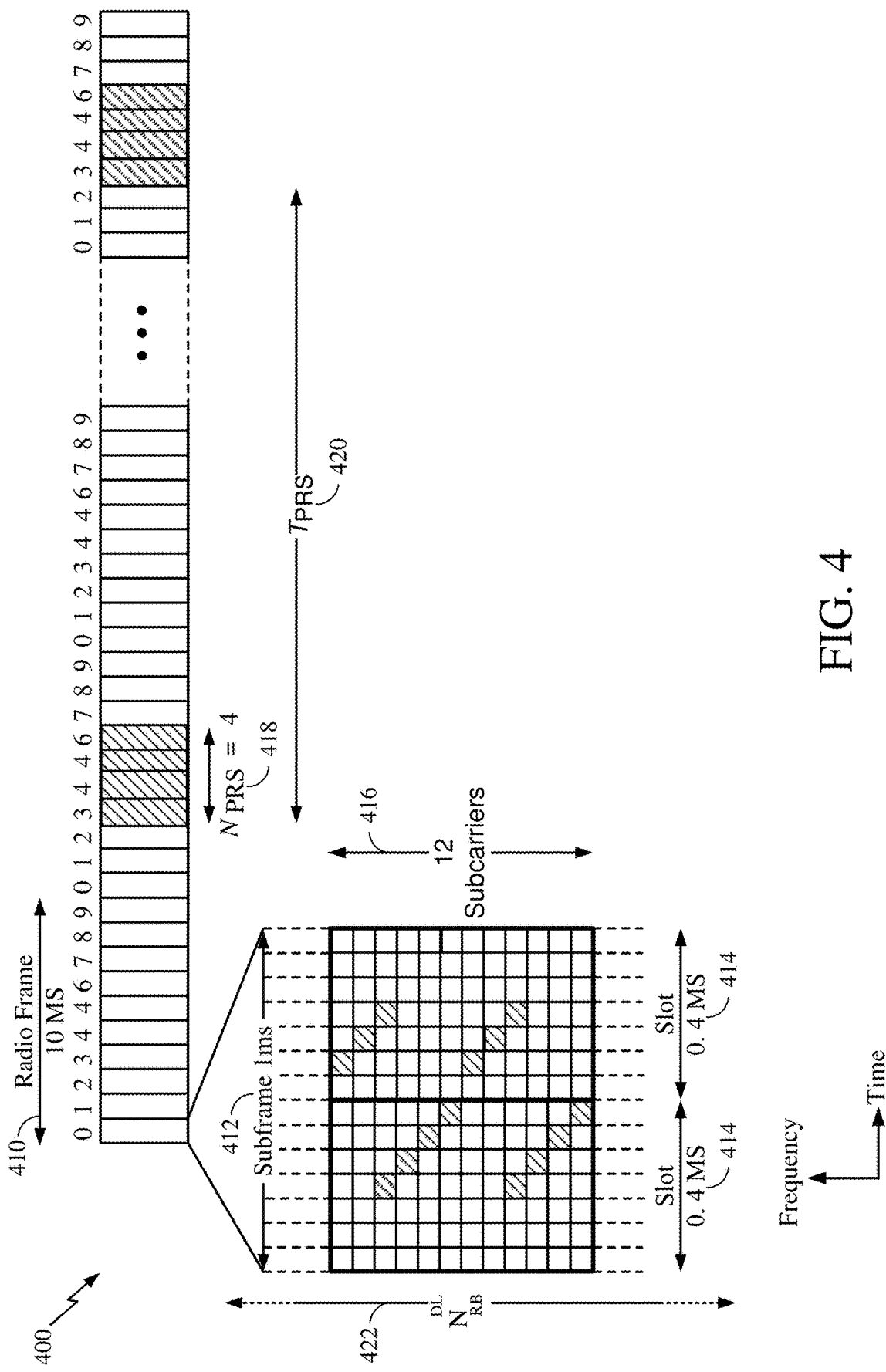
FIG. 4 is a diagram of a structure of an exemplary subframe sequence with PRS positioning occasions.

FIG. 4 shows a structure of an exemplary subframe sequence 400 with PRS positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as Na. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a jth positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to PRS discussed above, UL PRS transmitted by UEs, sometimes referred to as sounding reference signals (SRS) in NR are UE-specifically configured reference signals used for the purposes of the sounding the uplink radio channel Like for channel state information reference signals (CSI-RS), such sounding provides various levels of knowledge of the radio channel characteristics. For example, the SRS can be used at the gNB simply to obtain signal strength measurements, e.g., for the purposes of UL beam management. In another example, SRS can be used at the gNB to obtain detailed amplitude and phase estimates as a function of frequency, time, and space. In NR, channel sounding with SRS supports a more diverse set of use cases compared to LTE. For example, SRS supports downlink CSI acquisition for reciprocity-based gNB transmit beamforming (downlink MIMO), uplink CSI acquisition for link adaptation and codebook/non-codebook based precoding for uplink MIMO, and uplink beam management.

The time/frequency mapping of an SRS resource may be defined by the following characteristics. Time duration NsymbSRS is the time duration of an SRS resource, which can be 1, 2, or 4 consecutive OFDM symbols within a slot, in contrast to LTE which allows only a single OFDM symbol per slot. Starting symbol location $l_0$ is the starting symbol of an SRS resource, which can be located anywhere within the last 6 OFDM symbols of a slot provided the resource does not cross the end-of-slot boundary. Repetition factor R is for an SRS resource configured with frequency hopping, repetition allows the same set of subcarriers to be sounded in R consecutive OFDM symbols before the next hop occurs. The allowed values of R are 1,2,4 where R≤NsymbSRS. Transmission comb spacing $K_{TC}$ and comb offset kTC define a frequency domain comb structure occupied by resource elements (REs) of an SRS resource, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , KTC–1 REs. Thus, for comb spacing KTC=2, there are 2 different combs available for multiplexing if needed, and for comb spacing KTC=4, there are 4 different available combs. For the case of periodic and semi-persistent SRS, a periodicity is semi-statically configured such that the resource is transmitted once every N slots where the allowed configurable values are N∈{1,2,4,5,8,10, 16,20,32,40,64,80,160,320,640,1280,2560}. In addition, an offset O is configured where O∈{0,1, . . . , N–1} measured in number of slots. The reference point for the slot offset is with respect to the first slot (slot 0) of radio frame 0. The bandwidth (BW) configuration of an SRS resource is controlled by the RRC parameters; C_"SRS", n_"shift", B_"SRS", b_"hop", and n_"RRC". Together these parameters define which portion of a bandwidth part (BWP) is sounded by an SRS resource. The parameter C_"SRS" ∈{0,1, . . . , 63} selects a bandwidth configuration for the SRS resource corresponding to a particular row of a length-64 Table. For positioning, the number of consecutive OFDM symbols in an SRS resource is configurable with one of the values in the set {1, 2, 4, 8, 12}. For positioning, starting positions in the time domain for the SRS resource can be anywhere in the slot, i.e. an offset $l_{offset}$ range of {0, 1, . . . , 13}. For positioning, with regard to UL Beam management/alignment towards serving and neighboring cells, UE transmit (Tx) beam-sweeping on UL SRS transmissions across multiple UL SRS Resources may be used.

As with UEs, base stations are not expected to blindly perform detection of UL PRS signals. The expected UL PRS configuration, as described above, may be provided to the UE, e.g., in assistance data. The UE may then transmit UL PRS signals consistent with the UL PRS configuration that the base stations are expecting. The base stations receive the UL PRS signals from the UE and generate positioning measurements based on the received signals and the expected UL PRS configuration. The positioning measurements are reported to the location server or the UE for position estimation.

A UE, however, may be unable to transmit UL PRS signals in accordance with the expected UL PRS configuration. If the UE fails to transmit the UL PRS signals with the expected PRS configuration, positioning measurements performed by the base stations will be inaccurate as they will be based on the expected UL PRS configuration. In accordance with an implementation, the UE may send a reference signal transmission report to a network entity, such as a location server, another base station, or a transmission reception point (TRP), indicating that the UL PRS signals were not transmitted according to expected UL PRS configuration, e.g., in an unableToTransmit-ul-prs message.

A UE may fail to transmit the UL PRS signals in accordance with the expected UL PRS configuration in various manners. For example, the UE may not be able to transmit the UL PRS signals at all, may transmit the UL PRS signals with lower power than configured, may transmit the UL PRS signals on a different beam than configured, or a combination thereof. Thus, the reference signal transmission report provided by the UE may identify the manner in which the UL PRS signals were not in accordance with the expected UL PRS configuration, e.g., the UE may not be able to transmit the UL PRS signals at all, may transmit the UL PRS signals with lower power than configured, may transmit the UL PRS signals with a different spatial relation, i.e., on a different beam, than configured, or a combination thereof.

Moreover, there may be a variety of reasons that the UE cannot transmit the UL PRS signals in accordance with the expected UL PRS configurations. The reasons that the UL PRS signals are not transmitted in accordance with the expected UL PRS configurations may be dynamic, i.e., the location server cannot know beforehand that the UL PRS signals will not be transmitted in accordance with the expected UL PRS configurations. In accordance with an implementation, the reference signal transmission report from the UE may additionally provide reasons why the UL PRS signals were not transmitted according to expected UL PRS configuration.

For example, the UE may be unable to transmit the UL PRS signals because the UE is in the process of a serving Cell change, i.e., handover. For example, the UE may be in reconfiguration mode due to the Cell change and is unable to transmit the UL PRS signals. The UE may be unable to transmit the UL PRS signal due to collision with a DL symbol. The UE may be unable to transmit the UL PRS signal due to collision with another UL PHY channel, e.g., the colliding UL PHY channel may have a higher priority for transmission. The UE may be unable to transmit the UL PRS signal due to being outside the active bandwidth part of the UE. For example, the wideband spectrum in the NR network may be divided into multiple, e.g., four, non-overlapping sub-bands, where one sub-band may be assigned to the BWP of the UE, and the UL PRS signal is configured to be in a different sub-band. The UE may be unable to transmit the UL PRS signal due to interruption caused by uplink or downlink RF retuning time. For example, during carrier switching or during an UL and/or DL retuning phase, rf-RetuningTimeUL and/or rf-RetuningTimeDL, the UE is unable to transmit UL PRS signals. The UE may be unable to transmit the UL PRS signal due to the UE being in an idle mode, such as discontinuous reception (DRX) mode. For example, DRX is a mechanism in which the UE goes into a "sleep" mode for a certain period of time and "wakes up" for another period of time. If the UL PRS signal is configured to be transmitted during a "sleep" period, the UE cannot transmit the UL PRS signal.

The UE may transmit the UL PRS signals, but the transmission may not be in accordance with the expected UL PRS configuration. For example, the UE may transmit the UL PRS signals but with lower power than is expected, i.e., not in accordance with the UL PRS configuration. For example, the UE may transmit the UL PRS signals with lower power than expected due to carrier aggregation uplink power limitations. For example, if the UE is transmitting on a primary component carrier and a secondary component carrier, the total uplink power of a UE is limited and the DL PRS transmission may be transmitted with reduced power. The UE may transmit the UL PRS signals with lower power than expected due to Dual Connectivity (DC). For example, similar to carrier aggregation uplink power limitations, the total uplink power of a UE may be limited when the UE transmits and receives signals on multiple component carriers and the DL PRS transmission may be transmitted with reduced power. The UE may transmit the UL PRS signals with lower power than expected due to Maximum Permissible Exposure (MPE), e.g., safety limitations due to the use of FR2. Additionally, the UE may transmit the UL PRS signals with lower power or not transmit the UL PRS signal due to being in a low battery state.

The UE may transmit the UL PRS signals on a beam that is different than expected. For example, in FR2, the UE may transmit the UL PRS signals but not use the spatial-Tx-Reference that is configured due to collision with a Tx beam of a higher priority channel.

In accordance with an implementation, the reference signal transmission report by the UE may provide additional information with respect to the UL PRS signals that were not transmitted according to expected UL PRS configuration. For example, the UE may indicate the slot ID or subframe ID or frame ID that contains the UL PRS signals for positioning that were affected. The UE may indicate the resource ID, or resource set ID of the UL PRS signal that were affected. If a UE was not able to transmit the UL PRS signal according to the expected spatial relation configuration, e.g., on a specific Tx-beam, the UE may indicate that the Reference ID of a DL signal (e.g. SSB or DL PRS or CSIRS) that is configured for the spatial relation between a reference signal from the transmission-reception point and the UL PRS signal. For example, if the UL PRS is transmitted with a different beam than the one configured, the UE may report which beam was used. The UE may indicate the Reference ID of a DL signal that is configured for path loss determination between a reference signal from the transmission-reception point and the UL PRS signal. The UE may indicate the symbols, or a group of symbols of the UL PRS signals that were affected. If there was collision with another UL channel, the UE may indicate the type of channel of the affected UL PRS, or whether the UL channel is periodic, semi-persistent, or aperiodic. The UE may provide information relative to the idle mode, e.g., the DRX configuration.

Figure 5:
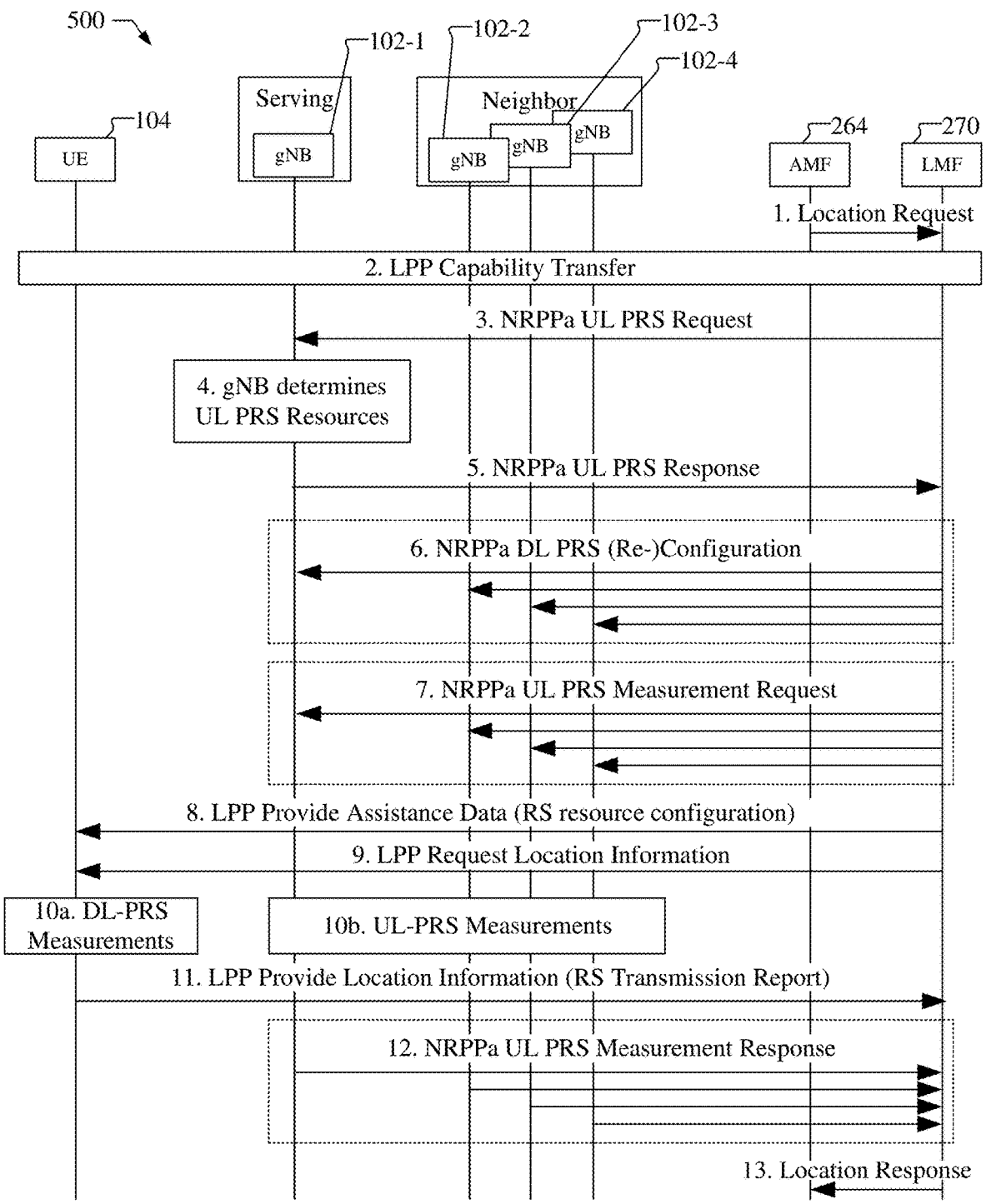
FIG. 5 is a diagram illustrating a signaling flow illustrating various messages between a UE and a location server supporting reference signal transmission reports by UE.

FIG. 5 shows a signaling flow 500 that illustrates various messages sent between components of the communication systems depicted in FIGS. 1, 2A, 2B, and 3 during a location session that supports UL based or DL and UL based positioning methods. FIG. 5 illustrates communications within an NR network between UE 104, and base stations (TRPs) including a serving gNB 102-1, neighbor gNBs 102-2, 102-3, 102-4, and AMF 264 and LMF 270. It should be understood, however, that other types of networks, such as LTE networks may be used, in which the base stations (TRPs) are eNbs, and a Mobility Management Entity (MME) may be used in place of AMF 264 and an Enhanced Serving Mobile Location Center (E-SMLC) may be used as the location server. FIG. 5 illustrates a procedure in which the UE may provide a reference signal transmission report indicating that UL PRS signals were not transmitted in accordance with an expected UL PRS configuration, which may be used by the location server, e.g., LMF 270, during position estimation.

At stage 1, the AMF 264 sends a location request message to the LMF 270.

At block 2, an LPP capability transfer is performed between the UE 104 and the LMF 270. The positioning capabilities may include, e.g., the ability to transmit UL PRS signals for positioning and the ability to provide a reference signal transmission report.

At stage 3, the LMF 270 sends an NRPPa UL PRS Request message to the serving base station, gNB 102-1.

At block 4, the serving gNB 102-1 determines the UL PRS resources to be used.

At stage 5, the serving gNB 102-1 sends an NRPPa UL PRS Response message to the LMF 270.

At stage 6, the LMF 270 sends NRPPa DL PRS (re)configuration message to the serving base station, gNB 102-1, and the neighbor base stations, gNBs 102-2, 102-3, and 102-4. The DL PRS (re)configuration message configures, or re-configures, the base stations to provide DL PRS signals to the UE. If only UL based positioning methods will be used to estimate the position of the UE 104 stage 6 may be omitted.

At stage 7, the LMF 270 sends NRPPa UL PRS measurement request message to the serving base station, gNB 102-1, and the neighbor base stations, gNBs 102-2, 102-3, and 102-4. The UL PRS measurement request message requests that the base stations obtain position measurements of UL PRS signals to be transmitted by the UE 104 and provides the expected UL PRS configuration for the UL PRS signals.

At stage 8, the LMF 270 may send an LPP Provide Assistance Data message to the UE 104 to provide positioning assistance data to assist the UE 104 to acquire and measure DL PRS signals from the base stations (if used) and to provide a reference signal (RS) resource configuration, i.e., the expected UL PRS configuration. In some implementations, the LPP Provide Assistance Data message to the UE 104 may be transmitted by the serving base station 102-1.

At stage 9, the LMF 270 sends an LPP Request Location Information message to the UE 104 to request that the UE 104 measure DL PRS transmission by the base stations (if used) and to transmit UL PRS signals for positioning. For example, the LMF 270 may request measurements of TOA if RTT or multi-RTT is used, or to transmit UL PRS signals in accordance with the RS resource configuration provided at stage 8.

At stage 10*a*, the UE 104 performs DL PRS measurements of any DL PRS signals transmitted by the base stations (if used).

At stage 10*b*, the UE 104 transmits or attempts to transmit UL PRS signals to TRPs, e.g., the base stations, gNBs 102-1, 102-2, 102-3, and 102-4, which perform UL PRS measurements of any UL PRS signals transmitted by the UE 104. As discussed above, the UE 104 may not be able to transmit one or more UL PRS signals or may transmit one or more UL PRS signals in a manner that is not in accordance with the RS resource configuration received at stage 8, as discussed above.

At stage 11, the UE 104 sends an LPP Provide Location Information message to the LMF 270 that includes the DL PRS measurements obtained at stage 10*a* (if used) and includes a reference signal transmission report indicating if any UL PRS signals were not sent in accordance with the RS resource configuration received at stage 8, e.g., an unableToTransmit-ul-prs message. For example, the message may include an information element (IE) that provides error reasons, such as missing assistance data (dl-assistance-data-missing), could not measure any DL PRS (unableToMeasureAnyTRP), could not measure DL PRS from some neighbor TRPs (attemptedButUnableToMeasureSomeNeighbourTRPs), missing uplink configuration information (ul-srs-configuration-missing), as well as unable to transmit the UL PRS (unableToTransmit-ul-prs). For example, if the UE 104 was requested to perform multi-RTT, the error message may be in IE NR-Multi-RTT-TargetDeviceErrorCauses. As discussed above, the reference signal transmission report may include information with respect to the manner in which the UL PRS signals were not in accordance with the RS resource configuration, e.g., the UL PRS signals were not sent, were sent with lower power than configured, or were sent with a different spatial relation, i.e., on a different beam, than configured. The reference signal transmission report may further include information with respect to the reason that the UL PRS signals were not transmitted in accordance with the RS resource configuration, as discussed above. The reference signal transmission report may further include additional information relevant to the UL PRS signals were not transmitted in accordance with the RS resource configuration, as discussed above.

At stage 12, the serving base station, gNB 102-1, and the neighbor base stations, gNBs 102-2, 102-3, and 102-4 send NRPPa UL PRS measurement response messages to the LMF 270 that include the UL PRS measurements obtained at stage 10*b*. As discussed above, the UL PRS measurements were made by the base stations based on the expected UL PRS configurations provided at stage 7 and, accordingly, the UL PRS measurements may be inaccurate if the UL PRS signals were not transmitted in accordance with the expected UL PRS configurations.

At stage 13, the LMF 270 may use the reference signal transmission report received from the UE 104 at stage 11 and the UL PRS measurements received at stage 12, as well as the DL PRS measurements received at stage 11 (if any), to determine a position estimate of the UE 104, if possible, and send a location response to the AMF 264. The LMF 270, for example, may use the reference signal transmission report from the UE 104 to exclude or modify some or all of the UL PRS measurements received at stage 12 in the position estimate. In some implementations, the LMF 270 may use the reference signal transmission report from the UE 104 to determine a different RS resource configuration and may return to stage 7 in the message flow providing the base stations and UE with the revised RS resource configuration.

Figure 6:
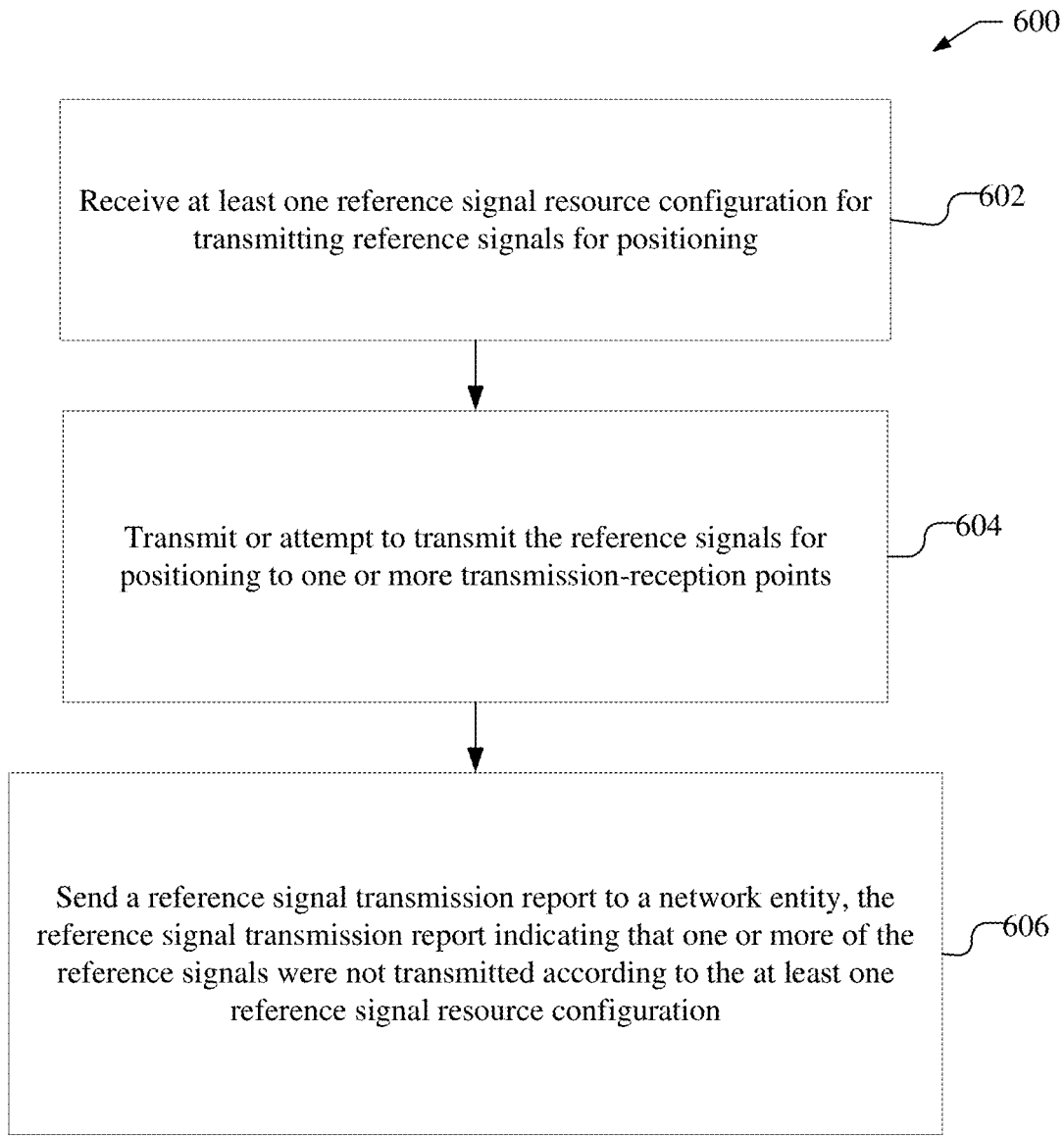
FIG. 6 is a process flow illustrating a method performed by a UE that supports positioning of the UE.

FIG. 6 illustrates an example of a process flow 600 that supports positioning of a user equipment (UE). The process flow 600 may include operations by a UE, such as a UE depicted in FIG. 1, 2A, 2B, 3, or 5, that is in communication with a transmission-reception point, such as a base station 102, and a location server, such as LMF 270.

Process flow 600 may start at block 602, where the UE receives at least one reference signal resource configuration for transmitting reference signals for positioning, e.g., as described with reference to stage 8 in FIG. 5. The reference signals for example may be, e.g., UL PRS signals, such as sounding reference signals (SRS).

At block 604, the UE may transmits or attempts to transmit the reference signals for positioning to one or more transmission-reception points, such as gNB 102, as described with reference to stage 10*b* in FIG. 5. The UE, for example, may fail to transmit the reference signals or may transmit the reference signals in a manner that is not in accordance with the reference signal resource configuration.

At block 606, the UE may send a reference signal transmission report to a network entity, the reference signal transmission report indicating that one or more of the reference signals were not transmitted according to the at least one reference signal resource configuration, e.g., as described at stage 11 of FIG. 5. The network entity, for example may be, e.g., a location server, a base station, or a transmission-reception point.

In some implementations, the reference signal transmission report may further indicate that the one or more of the reference signals were not transmitted with the at least one reference signal resource configuration due to one or more of the following: the UE was unable to transmit the one or more of the reference signals; the one or more of the reference signals were transmitted with lower power than configured by the at least one reference signal resource configuration; the one or more of the reference signals were transmitted on a different beam than configured by the at least one reference signal resource configuration; and any combination thereof, e.g., as described at stage 11 of FIG. 5.

In one implementation, the reference signal transmission report further indicates reasons that the one or more of the reference signals were not transmitted with the at least one reference signal resource configuration. For example, the reasons that the one or more of the reference signals were not transmitted with the at least one reference signal resource configuration may comprise one or more of the following: unable to transmit due to a serving Cell change; unable to transmit due to a collision with a downlink symbol; unable to transmit due to a collision with other uplink physical (PHY) channel; unable to transmit due to the at least one reference signal resource configuration being outside active bandwidth part; unable to transmit due to a collision with uplink or downlink radio frequency retuning time; transmitted the one or more of the reference signals with lower power than configured by the at least one reference signal resource configuration due to Carrier Aggregation Power limitations or Dual Connectivity (DC) or Maximum Permissible Exposure (MPE); transmitted the one or more of the reference signals using a spatial relation different than that configured by the at least one reference signal resource configuration due to a collision of a configured spatial relation with one of a higher priority channel; unable to transmit due to being in a discontinuous reception (DRX) mode; unable to transmit or transmitted the one or more of the reference signals with lower power than configured by the at least one reference signal resource configuration due to being in a low battery state; and any combination thereof. In one implementation, the reference signal transmission report may further indicate one or more of the following: a slot ID, a subframe ID, or a frame ID that contains the one or more of the reference signals; a resource ID or resource set ID of the one or more of the reference signals; a reference ID of a first downlink signal that is configured for a spatial relation between a reference signal from a transmission-reception point and the reference signals configured with the at least one reference signal resource configuration if the one or more of the reference signals were not transmitted according to the spatial relation configuration of the at least one reference signal resource configuration; a spatial relation information according to which the one or more of the reference signals were transmitted if the one or more of the reference signals were transmitted using a different spatial relation than configured by the at least one reference signal resource configuration; a reference ID of a second downlink signal that is configured for path loss determination between a reference signal from a transmission-reception point and the reference signals configured with the at least one reference signal resource configuration; a symbol or a group of symbols of the one or more of the reference signals that were affected; a type of uplink channel affected if the one or more of the reference signals were not transmitted due to a collision with other uplink physical (PHY) channel; whether an uplink channel affected is periodic, semi-persistent, or aperiodic if the one or more of the reference signals were not transmitted due to a collision with other uplink physical (PHY) channel; a DRX configuration of the UE; and any combination thereof.

In one implementation, the process flow 600 may further include receiving a second at least one reference signal resource configuration for transmitting reference signals, e.g., as described at stage 13 of FIG. 5.

In one implementation, the at least one reference signal resource configuration may be received from a location server.

In one implementation, the at least one reference signal resource configuration may be received from a serving cell. For example, the serving cell may be one of the one or more transmission-reception points.

Figure 7:
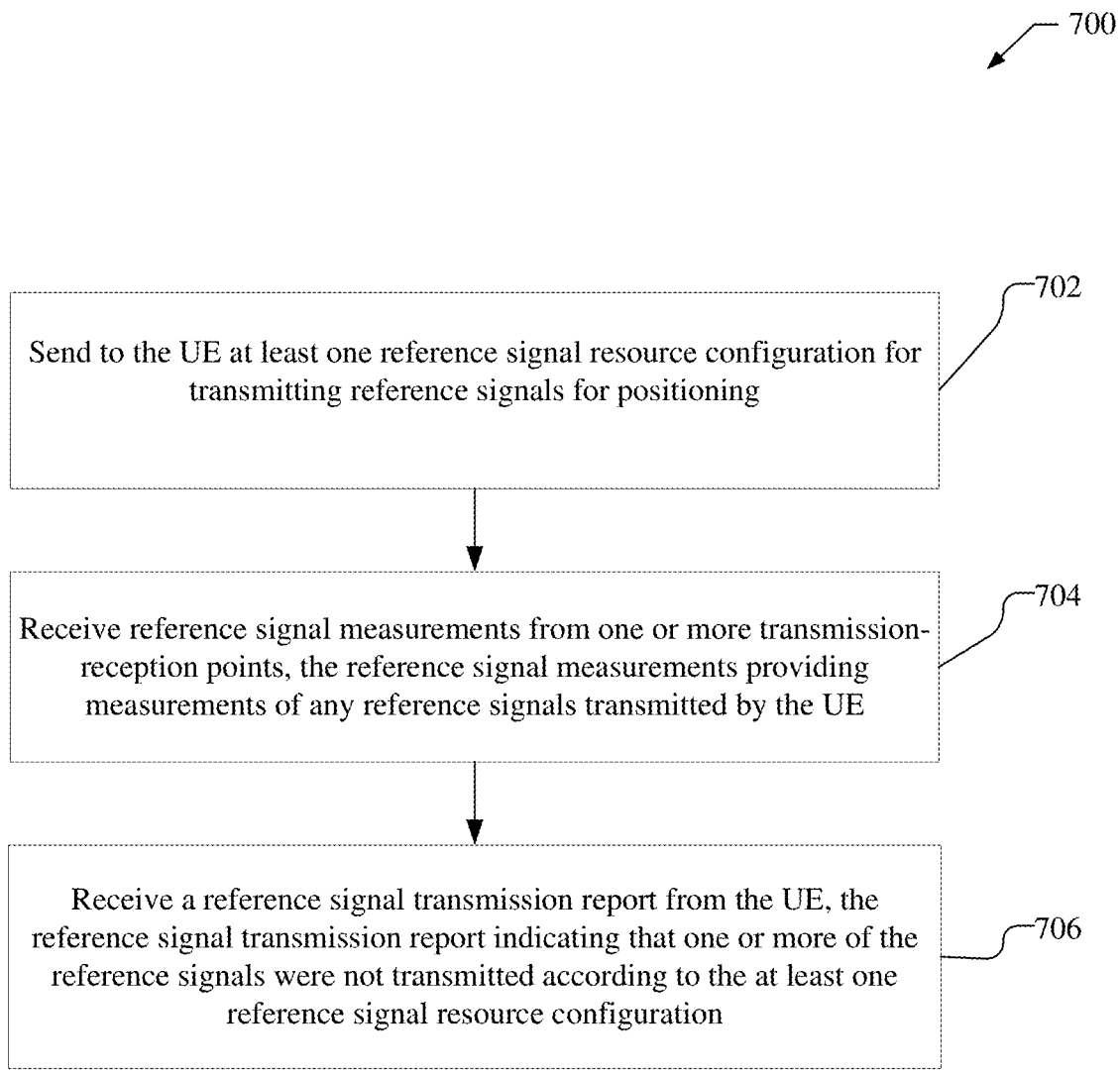
FIG. 7 is a process flow illustrating a method performed by a location server that supports positioning of the UE.

FIG. 7 illustrates an example of a process flow 700 that supports positioning of a user equipment (UE). The process flow 700 may include operations by a location server, such as LMF 270, that is in communication with the UE as depicted in FIG. 1, 2A, 2B, 3, or 5, and a transmission-reception point, such as a base station 102.

Process flow 700 may start at block 702, where the location server may sned to the UE at least one reference signal resource configuration for transmitting reference signals for positioning, e.g., as described with reference to stage 8 in FIG. 5. The reference signals for example may be, e.g., UL PRS signals, such as sounding reference signals (SRS).

At block 704, the location server may receive reference signal measurements from one or more transmission-reception points, the reference signal measurements providing measurements of any reference signals transmitted by the UE, e.g., as described with reference to stage 12 in FIG. 5.

At block 706, the location may receive a reference signal transmission report from the UE, the reference signal transmission report indicating that one or more of the reference signals were not transmitted according to the at least one reference signal resource configuration, e.g., as described at stage 11 of FIG. 5.

In one implementation, the reference signal transmission report may further indicate that the one or more of the reference signals were not transmitted with the at least one reference signal resource configuration due to one or more of the following: the UE was unable to transmit the one or more of the reference signals; the one or more of the reference signals were transmitted with lower power than configured by the at least one reference signal resource configuration; the one or more of the reference signals were transmitted on a different beam than configured by the at least one reference signal resource configuration; and any combination thereof, e.g., as described at stage 11 of FIG. 5.

In one implementation, the reference signal transmission report may further indicate reasons that the one or more of the reference signals were not transmitted with the at least one reference signal resource configuration. For example, the reasons that the one or more of the reference signals were not transmitted with the at least one reference signal resource configuration may comprise one or more of the following: unable to transmit due to a serving Cell change; unable to transmit due to a collision with a downlink symbol; unable to transmit due to a collision with other uplink physical (PHY) channel; unable to transmit due to the at least one reference signal resource configuration being outside active bandwidth part; unable to transmit due to a collision with uplink or downlink radio frequency retuning time; transmitted the one or more of the reference signals with lower power than configured by the at least one reference signal resource configuration due to Carrier Aggregation Power limitations or Dual Connectivity (DC) or Maximum Permissible Exposure (MPE); transmitted the one or more of the reference signals using a spatial relation different than that configured by the at least one reference signal resource configuration due to a collision of a configured spatial relation with one of a higher priority channel; unable to transmit due to being in a discontinuous reception (DRX) mode; unable to transmit or transmitted the one or more of the reference signals with lower power than configured by the at least one reference signal resource configuration due to being in a low battery state; and any combination thereof. In one implementation, the reference signal transmission report may further indicate one or more of the following: a slot ID, a subframe ID, or a frame ID that contains the one or more of the reference signals; a resource ID or resource set ID of the one or more of the reference signals; a reference ID of a first downlink signal that is configured for a spatial relation between a reference signal from a transmission-reception point and the reference signals configured with the at least one reference signal resource configuration if the one or more of the reference signals were not transmitted according to a spatial relation configuration of the at least one reference signal resource configuration; a spatial relation information according to which the one or more of the reference signals were transmitted if the one or more of the reference signals were transmitted using a different spatial relation than configured by the at least one reference signal resource configuration; a reference ID of a second downlink signal that is configured for path loss determination between a reference signal from a transmission-reception point and the reference signals configured with the at least one reference signal resource configuration; a symbols or a group of symbols of the one or more of the reference signals that were affected; a type of uplink channel affected if the one or more of the reference signals were not transmitted due to a collision with other uplink physical (PHY) channel; whether an uplink channel affected is periodic, semi-persistent, or aperiodic if the one or more of the reference signals were not transmitted due to a collision with other uplink physical (PHY) channel; a DRX configuration of the UE; and any combination thereof.

In one implementation, the process flow 700 may further include sending to the UE a second at least one reference signal resource configuration for transmitting reference signals in response to the reference signal transmission report, e.g., as described at stage 13 of FIG. 5.

Figure 8:
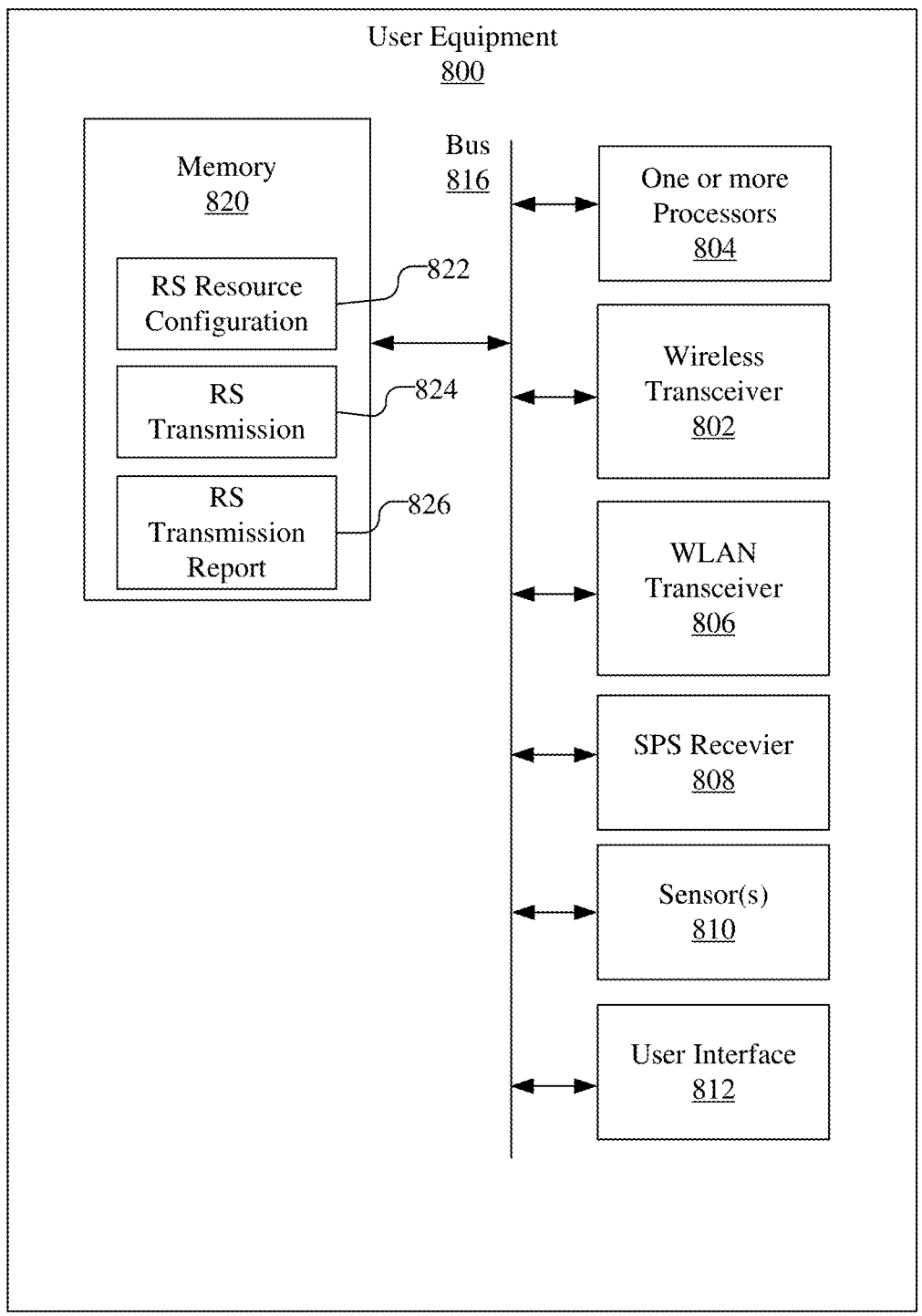
FIG. 8 is a block diagram of an embodiment of a UE capable of supporting reference signal transmission reports in accordance with aspects of the present disclosure.

FIG. 8 is a diagram illustrating an example of a hardware implementation of a user equipment (UE) 800, such as UE 104. The UE 800 may include a wireless transceiver 802 to wirelessly communicate with a network entity, e.g., such as base station 102 or location sever, such as LMF 270. The UE 800 may also include additional transceivers, such a wireless local area network (WLAN) transceiver 806, as well as an SPS receiver 808 for receiving and measuring signals from SPS SVs. The UE 800 may further include one or more sensors 810, such as cameras, accelerometers, gyroscopes, electronic compass, magnetometer, barometer, etc. The UE 800 may further include a user interface 812 that may include e.g., a display, a keypad or other input device, such as virtual keypad on the display, through which a user may interface with the UE 800. The UE 800 further includes one or more processors 804 and memory 820, which may be coupled together with bus 816. The one or more processors 804 and other components of the UE 800 may similarly be coupled together with bus 816, a separate bus, or may be directly connected together or coupled using a combination of the foregoing. The memory 820 may contain executable code or software instructions that when executed by the one or more processors 804 cause the one or more processors to operate as a special purpose computer programmed to perform the algorithms disclosed herein.

As illustrated in FIG. 8, the memory 820 may include one or more components or modules that may be implemented by the one or more processors 804 to perform the methodologies described herein. While the components or modules are illustrated as software in memory 820 that is executable by the one or more processors 804, it should be understood that the components or modules may be dedicated hardware either in the one or more processors 804 or off the processors.

As illustrated, the memory 820 may include a reference signal resource configuration unit 822, that configures the one or more processors 804 to receive, via wireless transceiver 802, at least one reference signal resource configuration for transmitting reference signals for positioning from, e.g., a location server.

A reference signal transmission unit 824 configures the one or more processors 804 to transmit, if possible, the reference signals for positioning to one or more transmission-reception points, e.g., base stations 102. The reference signals, for example, may be UL PRS signals, such as sound reference signals (SRS). The reference signal transmission unit 824 may not be able to transmit one or more reference signals or may transmit one or more reference signals with reduced power or with a different spatial relation than configured by the at least one reference signal resource configuration for various reasons, as discussed above.

The memory 820 may further include an reference signal transmission report unit 826 that configures the one or more processors 804 to transmit, via the wireless transceiver 802, a reference signal transmission report to a network entity, such as a location server, base station, or transmission-reception point, wherein the reference signal transmission report indicates that one or more of the reference signals were not transmitted according to the at least one reference signal resource configuration. The reference signal transmission report unit 826 may further configure the one or more processors 804 to indicate how the reference signals differed from the at least one reference signal resource configuration, and may further include the reasons that the one or more of the reference signals were not transmitted with the at least one reference signal resource configuration, and may further include additional information relevant to the reference signals that were not transmitted in accordance with the at least one reference signal resource configuration.

The methodologies described herein may be implemented by various means depending upon the application. For example, these methodologies may be implemented in hardware, firmware, software, or any combination thereof. For a hardware implementation, the one or more processors 804 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 800 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 820) and executed by one or more processors 804, causing the one or more processors 804 to operate as a special purpose computer programmed to perform the techniques disclosed herein. Memory may be implemented within the one or processors 804 or external to the one or more processors 804. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 800 may be stored as one or more instructions or code on a non-transitory computer-readable storage medium such as memory 820. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 800 may be provided as signals on transmission media included in a communication apparatus. For example, a communication apparatus comprising part or all of UE 800 may include a transceiver having signals indicative of instructions and data. The instructions and data are stored on non-transitory computer readable media, e.g., memory 820, and are configured to cause the one or more processors 804 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment (UE) capable of supporting positioning may include means for receiving at least one reference signal resource configuration for transmitting reference signals for positioning which may be, e.g., the wireless transceiver 802 and one or more processors 804 with dedicated hardware or implementing executable code or software instructions in memory 820 such as the reference signal resource configuration unit 822. A means for transmitting or attempting to transmit the reference signals for positioning to one or more transmission-reception points may be, e.g., the wireless transceiver 802 and one or more processors 804 with dedicated hardware or implementing executable code or software instructions in memory 820 such as the reference signal transmission unit 824. A means for sending a reference signal transmission report to a network entity, the reference signal transmission report indicating that one or more of the reference signals were not transmitted according to the at least one reference signal resource configuration may b, e.g., the wireless transceiver 802 and one or more processors 804 with dedicated hardware or implementing executable code or software instructions in memory 820 such as the reference signal transmission report unit 826.

In one implementation, the UE may further include a means for receiving a second at least one reference signal resource configuration for transmitting reference signals, which may be, e.g., the wireless transceiver 802 and one or more processors 804 with dedicated hardware or implementing executable code or software instructions in memory 820 such as the reference signal resource configuration unit 822.

Figure 9:
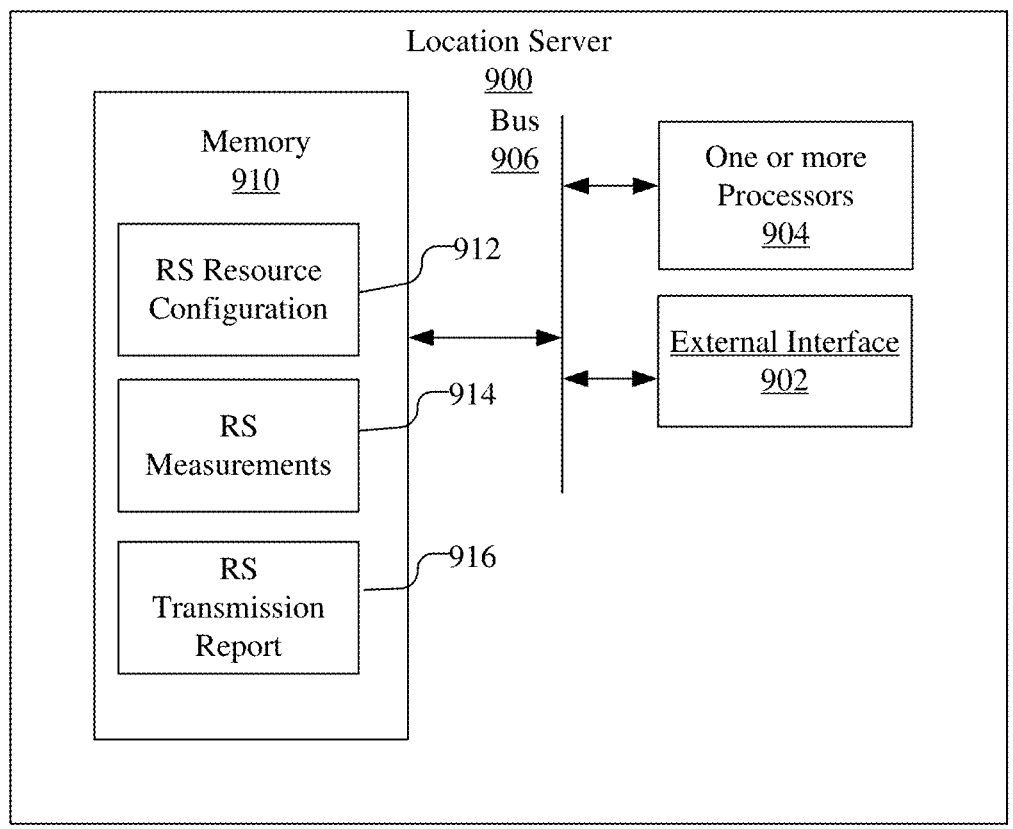
FIG. 9 is a block diagram of an embodiment of a location server capable of supporting reference signal transmission reports in accordance with aspects of the present disclosure.

FIG. 9 is a diagram illustrating an example of a hardware implementation of a location server 900, such as LMF 270. The location server 900 includes, e.g., hardware components such as an external interface 902, which may be a wired and/or wireless interface capable of connecting to a transmission-reception point or a base station or, such as gNB 102, and capable of wirelessly connecting to UE 104. The location server 900 includes a one or more processors 904 and memory 910, which may be coupled together with bus 906. The memory 910 may contain executable code or software instructions that when executed by the one or more processors 904 cause the one or more processors 904 to operate as a special purpose computer programmed to perform the procedures and techniques disclosed herein.

As illustrated in FIG. 9, the memory 910 includes one or more components or modules that when implemented by the one or more processors 904 implements the methodologies as described herein. While the components or modules are illustrated as software in memory 910 that is executable by the one or more processors 904, it should be understood that the components or modules may be dedicated hardware either in the processor or off processor.

As illustrated, the memory 910 may include a reference signal resource configuration unit 912 that configures the one or more processors 904 to send, via external interface 902 at least one reference signal resource configuration for transmitting reference signals for positioning. The reference signals, for example, may be UL PRS signals, such as sound reference signals (SRS).

The memory 820 may further include a reference signal measurements unit 914 that configures the one or more processors 904 to receive from one or more transmission-reception points, via external interface 902, the reference signal measurements providing measurements of any reference signals transmitted by the UE.

The memory 820 may further include reference signal transmission report unit 916 that configures the one or more processors 904 to receive, via external interface 902, the a reference signal transmission report from the UE, the reference signal transmission report indicating that one or more of the reference signals were not transmitted according to the at least one reference signal resource configuration.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 910, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server capable of supporting positioning of a user equipment (UE), may include a means for transmitting to the UE at least one reference signal resource configuration for transmitting reference signals for positioning, which may be, e.g., the external interface 902 and one or more processors 904 with dedicated hardware or implementing executable code or software instructions in memory 910 such as the reference signal resource configuration unit 912. A means for receiving reference signal measurements from one or more transmission-reception points, the reference signal measurements providing measurements of any reference signals transmitted by the UE may be, e.g., the external interface 902 and one or more processors 904 with dedicated hardware or implementing executable code or software instructions in memory 910 such as the reference signal measurements unit 914. A means for receiving a reference signal transmission report from the UE, the reference signal transmission report indicating that one or more of the reference signals were not transmitted according to the at least one reference signal resource configuration may be, e.g., the external interface 902 and one or more processors 904 with dedicated hardware or implementing executable code or software instructions in memory 910 such as the reference signal transmission report unit 916.

In one implementation, the location server may further include means for transmitting to the UE a second at least one reference signal resource configuration for transmitting reference signals in response to the reference signal transmission report, which may be, e.g., the external interface 902 and one or more processors 904 with dedicated hardware or implementing executable code or software instructions in memory 910 such as the reference signal resource configuration unit 912.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In one implementation (1), a method of supporting positioning of a user equipment (UE) performed by a location server, comprising: sending to the UE at least one reference signal resource configuration for transmitting reference signals for positioning; receiving reference signal measurements from one or more transmission-reception points, the reference signal measurements providing measurements of any reference signals transmitted by the UE; and receiving a reference signal transmission report from the UE, the reference signal transmission report indicating that one or more of the reference signals were not transmitted according to the at least one reference signal resource configuration.

There may be some implementations (2) of the above-described method (1), wherein the reference signal transmission report further indicates that the one or more of the reference signals were not transmitted with the at least one reference signal resource configuration due to one or more of the following: the UE was unable to transmit the one or more of the reference signals; the one or more of the reference signals were transmitted with lower power than configured by the at least one reference signal resource configuration; the one or more of the reference signals were transmitted on a different beam than configured by the at least one reference signal resource configuration; and any combination thereof.

There may be some implementations (3) of the above-described method (1), wherein the reference signal transmission report further indicates reasons that the one or more of the reference signals were not transmitted with the at least one reference signal resource configuration.

There may be some implementations (4) of the above-described method (3), wherein the reasons that the one or more of the reference signals were not transmitted with the at least one reference signal resource configuration comprise one or more of the following: unable to transmit due to a serving Cell change; unable to transmit due to a collision with a downlink symbol; unable to transmit due to a collision with other uplink physical (PHY) channel; unable to transmit due to the at least one reference signal resource configuration being outside active bandwidth part; unable to transmit due to a collision with uplink or downlink radio frequency retuning time; transmitted the one or more of the reference signals with lower power than configured by the at least one reference signal resource configuration due to Carrier Aggregation Power limitations or Dual Connectivity (DC) or Maximum Permissible Exposure (MPE); transmitted the one or more of the reference signals using a spatial relation different than that configured by the at least one reference signal resource configuration due to a collision of a configured spatial relation with one of a higher priority channel; unable to transmit due to being in a discontinuous reception (DRX) mode; unable to transmit or transmitted the one or more of the reference signals with lower power than configured by the at least one reference signal resource configuration due to being in a low battery state; and any combination thereof.

There may be some implementations (5) of the above-described method (4), wherein the reference signal transmission report further indicates one or more of the following: a slot ID, a subframe ID, or a frame ID that contains the one or more of the reference signals; a resource ID or resource set ID of the one or more of the reference signals; a reference ID of a first downlink signal that is configured for a spatial relation between a reference signal from a transmission-reception point and the reference signals configured with the at least one reference signal resource configuration if the one or more of the reference signals were not transmitted according to a spatial relation configuration of the at least one reference signal resource configuration; a spatial relation information according to which the one or more of the reference signals were transmitted if the one or more of the reference signals were transmitted using a different spatial relation than configured by the at least one reference signal resource configuration; a reference ID of a second downlink signal that is configured for path loss determination between a reference signal from a transmission-reception point and the reference signals configured with the at least one reference signal resource configuration; a symbols or a group of symbols of the one or more of the reference signals that were affected; a type of uplink channel affected if the one or more of the reference signals were not transmitted due to a collision with other uplink physical (PHY) channel; whether an uplink channel affected is periodic, semi-persistent, or aperiodic if the one or more of the reference signals were not transmitted due to a collision with other uplink physical (PHY) channel; a DRX configuration of the UE; and any combination thereof.

There may be some implementations (6) of the above-described method (1), further comprising: sending to the UE a second at least one reference signal resource configuration for transmitting reference signals in response to the reference signal transmission report.

There may be some implementations (7) of the above-described method (1), wherein the reference signals comprise sounding reference signals (SRS).

In one implementation (8), a location server capable of supporting positioning of a user equipment (UE), comprising: an external interface for receiving and sending messages; at least one memory; and at least one processor coupled to the external interface and the at least one memory, the at least one processor configured to: send to the UE at least one reference signal resource configuration for transmitting reference signals for positioning; receive reference signal measurements from one or more transmission-reception points, the reference signal measurements providing measurements of any reference signals transmitted by the UE; and receive a reference signal transmission report from the UE, the reference signal transmission report indicating that one or more of the reference signals were not transmitted according to the at least one reference signal resource configuration.

There may be some implementations (9) of the above-described location server (8), wherein the reference signal transmission report further indicates that the one or more of the reference signals were not transmitted with the at least one reference signal resource configuration due to one or more of the following: the UE was unable to transmit the one or more of the reference signals; the one or more of the reference signals were transmitted with lower power than configured by the at least one reference signal resource configuration; the one or more of the reference signals were transmitted on a different beam than configured by the at least one reference signal resource configuration; and any combination thereof.

There may be some implementations (10) of the above-described location server (8), wherein the reference signal transmission report further indicates reasons that the one or more of the reference signals were not transmitted with the at least one reference signal resource configuration.

There may be some implementations (11) of the above-described location server (10), wherein the reasons that the one or more of the reference signals were not transmitted with the at least one reference signal resource configuration comprise one or more of the following: unable to transmit due to a serving Cell change; unable to transmit due to a collision with a downlink symbol; unable to transmit due to a collision with other uplink physical (PHY) channel; unable to transmit due to the at least one reference signal resource configuration being outside active bandwidth part; unable to transmit due to a collision with uplink or downlink radio frequency retuning time; transmitted the one or more of the reference signals with lower power than configured by the at least one reference signal resource configuration due to Carrier Aggregation Power limitations or Dual Connectivity (DC) or Maximum Permissible Exposure (MPE); transmitted the one or more of the reference signals using a spatial relation different than that configured by the at least one reference signal resource configuration due to a collision of a configured spatial relation with one of a higher priority channel; unable to transmit due to being in a discontinuous reception (DRX) mode; unable to transmit or transmitted the one or more of the reference signals with lower power than configured by the at least one reference signal resource configuration due to being in a low battery state; and any combination thereof.

There may be some implementations (12) of the above-described location server (11), wherein the reference signal transmission report further indicates one or more of the following: a slot ID, a subframe ID, or a frame ID that contains the one or more of the reference signals; a resource ID or resource set ID of the one or more of the reference signals; a reference ID of a first downlink signal that is configured for a spatial relation between a reference signal from a transmission-reception point and the reference signals configured with the at least one reference signal resource configuration if the one or more of the reference signals were not transmitted according to a spatial relation configuration of the at least one reference signal resource configuration; a spatial relation information according to which the one or more of the reference signals were transmitted if the one or more of the reference signals were transmitted using a different spatial relation than configured by the at least one reference signal resource configuration; a reference ID of a second downlink signal that is configured for path loss determination between a reference signal from a transmission-reception point and the reference signals configured with the at least one reference signal resource configuration; a symbols or a group of symbols of the one or more of the reference signals that were affected; a type of uplink channel affected if the one or more of the reference signals were not transmitted due to a collision with other uplink physical (PHY) channel; whether an uplink channel affected is periodic, semi-persistent, or aperiodic if the one or more of the reference signals were not transmitted due to a collision with other uplink physical (PHY) channel; a DRX configuration of the UE; and any combination thereof.

There may be some implementations (13) of the above-described location server (8), wherein the at least one processor is further configured to: send to the UE a second at least one reference signal resource configuration for transmitting reference signals in response to the reference signal transmission report.

There may be some implementations (14) of the above-described location server (8), wherein the reference signals comprise sounding reference signals (SRS).

In one implementation (15) a location server capable of supporting positioning of a user equipment (UE), comprising: means for sending to the UE at least one reference signal resource configuration for transmitting reference signals for positioning; means for receiving reference signal measurements from one or more transmission-reception points, the reference signal measurements providing measurements of any reference signals transmitted by the UE; and means for receiving a reference signal transmission report from the UE, the reference signal transmission report indicating that one or more of the reference signals were not transmitted according to the at least one reference signal resource configuration.

There may be some implementations (16) of the above-described location server (15), wherein the reference signal transmission report further indicates that the one or more of the reference signals were not transmitted with the at least one reference signal resource configuration due to one or more of the following: the UE was unable to transmit the one or more of the reference signals; the one or more of the reference signals were transmitted with lower power than configured by the at least one reference signal resource configuration; the one or more of the reference signals were transmitted on a different beam than configured by the at least one reference signal resource configuration; and any combination thereof.

There may be some implementations (17) of the above-described location server (15), wherein the reference signal transmission report further indicates reasons that the one or more of the reference signals were not transmitted with the at least one reference signal resource configuration.

There may be some implementations (18) of the above-described location server (17), wherein the reasons that the one or more of the reference signals were not transmitted with the at least one reference signal resource configuration comprise one or more of the following: unable to transmit due to a serving Cell change; unable to transmit due to a collision with a downlink symbol; unable to transmit due to a collision with other uplink physical (PHY) channel; unable to transmit due to the at least one reference signal resource configuration being outside active bandwidth part; unable to transmit due to a collision with uplink or downlink radio frequency retuning time; transmitted the one or more of the reference signals with lower power than configured by the at least one reference signal resource configuration due to Carrier Aggregation Power limitations or Dual Connectivity (DC) or Maximum Permissible Exposure (MPE); transmitted the one or more of the reference signals using a spatial relation different than that configured by the at least one reference signal resource configuration due to a collision of a configured spatial relation with one of a higher priority channel; unable to transmit due to being in a discontinuous reception (DRX) mode; unable to transmit or transmitted the one or more of the reference signals with lower power than configured by the at least one reference signal resource configuration due to being in a low battery state; and any combination thereof.

There may be some implementations (19) of the above-described location server (18), wherein the reference signal transmission report further indicates one or more of the following: a slot ID, a subframe ID, or a frame ID that contains the one or more of the reference signals; a resource ID or resource set ID of the one or more of the reference signals; a reference ID of a first downlink signal that is configured for a spatial relation between a reference signal from a transmission-reception point and the reference signals configured with the at least one reference signal resource configuration if the one or more of the reference signals were not transmitted according to a spatial relation configuration of the at least one reference signal resource configuration; a spatial relation information according to which the one or more of the reference signals were transmitted if the one or more of the reference signals were transmitted using a different spatial relation than configured by the at least one reference signal resource configuration; a reference ID of a second downlink signal that is configured for path loss determination between a reference signal from a transmission-reception point and the reference signals configured with the at least one reference signal resource configuration; a symbols or a group of symbols of the one or more of the reference signals that were affected; a type of uplink channel affected if the one or more of the reference signals were not transmitted due to a collision with other uplink physical (PHY) channel; whether an uplink channel affected is periodic, semi-persistent, or aperiodic if the one or more of the reference signals were not transmitted due to a collision with other uplink physical (PHY) channel; a DRX configuration of the UE; and any combination thereof.

There may be some implementations (20) of the above-described location server (15), further comprising: means for sending to the UE a second at least one reference signal resource configuration for transmitting reference signals in response to the reference signal transmission report.

There may be some implementations (21) of the above-described location server (15), wherein the reference signals comprise sounding reference signals (SRS).

In one implementation (22) a non-transitory storage medium including program code stored thereon, the program code is operable to configure at least one processor in a location server capable of supporting positioning of a user equipment (UE), comprising: program code to send to the UE at least one reference signal resource configuration for transmitting reference signals for positioning; program code to receive reference signal measurements from one or more transmission-reception points, the reference signal measurements providing measurements of any reference signals transmitted by the UE; and program code to receive a reference signal transmission report from the UE, the reference signal transmission report indicating that one or more of the reference signals were not transmitted according to the at least one reference signal resource configuration.

Therefore, it is intended that claimed subject matter not be limited to the particular examples disclosed, but that such claimed subject matter may also include all aspects falling within the scope of appended claims, and equivalents thereof.

What is claimed is:

1. A method of supporting positioning of a user equipment (UE) performed by the UE, comprising:
    receiving, at the UE, at least one reference signal resource configuration for transmitting reference signals for positioning;
    attempting to transmit, from the UE, one or more of the reference signals for positioning to one or more transmission-reception points based on the at least one reference signal resource configuration;
    detecting, at the UE, that the attempt to transmit the one or more of the reference signals was not in accordance with the at least one reference signal resource configuration; and
    transmitting, from the UE, a reference signal transmission report to a network entity, the reference signal transmission report indicating that one or more of the reference signals attempted to be transmitted from the UE were not transmitted from the UE according to the at least one reference signal resource configuration, and indicating reasons that the one or more of the reference signals were not transmitted with the at least one reference signal resource configuration, wherein the indicated reasons comprise one or more of:
        the UE was unable to transmit the one or more of the reference signals;
        the one or more of the reference signals were transmitted with lower power than configured by the at least one reference signal resource configuration;

the one or more of the reference signals were transmitted on a different beam than configured by the at least one reference signal resource configuration; or any combination thereof.

2. The method of claim 1, wherein the reasons that the one or more of the reference signals were not transmitted with the at least one reference signal resource configuration comprise one or more of:
unable to transmit due to a serving Cell change;
unable to transmit due to a first collision with a downlink symbol;
unable to transmit due to a second collision with a first other uplink physical (PHY) channel;
unable to transmit due to the at least one reference signal resource configuration being outside an active bandwidth part;
unable to transmit due to a third collision with uplink or downlink radio frequency retuning time;
the one or more of the reference signals were transmitted with a first lower power than configured by the at least one reference signal resource configuration due to at least one of Carrier Aggregation Power limitations, Dual Connectivity (DC), or Maximum Permissible Exposure (MPE);
the one or more of the reference signals were transmitted using a first spatial relation different than configured by the at least one reference signal resource configuration due to a fourth collision of a configured spatial relation with one of a higher priority channel;
unable to transmit due to being in a discontinuous reception (DRX) mode;
the one or more of the reference signals were transmitted with a second lower power than configured by the at least one reference signal resource configuration due to a low battery state associated with the UE; or
any combination thereof.

3. The method of claim 2, wherein the reference signal transmission report further indicates one or more of:
a slot ID, a subframe ID, or a frame ID that contains the one or more of the reference signals;
a resource ID or resource set ID of the one or more of the reference signals;
a first reference ID of a first downlink signal configured for a second spatial relation between a first reference signal from a first transmission-reception point and one or more of the reference signals configured with the at least one reference signal resource configuration in response to the one or more of the reference signals not being transmitted according to a spatial relation configuration of the at least one reference signal resource configuration;
a spatial relation information associated with the one or more of the reference signals in response to the one or more of the reference signals being transmitted using a different spatial relation than configured by the at least one reference signal resource configuration;
a second reference ID of a second downlink signal configured for path loss determination between a second reference signal from a second transmission-reception point and one or more of the reference signals configured with the at least one reference signal resource configuration;
a symbol or a group of symbols of the one or more of the reference signals;
a type of a first uplink channel affected in response to the one or more of the reference signals not being transmitted due to a fifth collision with a second other uplink PHY channel;
whether a second uplink channel affected is periodic, semi-persistent, or aperiodic in response to the one or more of the reference signals not being transmitted due to a sixth collision with a third other uplink PHY channel;
a DRX configuration of the UE; or
any combination thereof.

4. The method of claim 1, further comprising:
receiving a second at least one reference signal resource configuration for transmitting reference signals after the transmission of the reference signal transmission report.

5. The method of claim 1, wherein receiving the at least one reference signal resource configuration comprises receiving the at least one reference signal resource configuration from a location server.

6. The method of claim 1, wherein receiving the at least one reference signal resource configuration comprises receiving the at least one reference signal resource configuration from a serving cell.

7. The method of claim 6, wherein the serving cell comprises one of the one or more transmission-reception points.

8. The method of claim 1, wherein the reference signals comprise sounding reference signals (SRS).

9. The method of claim 1, wherein the network entity comprises one of a location server, a base station, or a transmission-reception point.

10. A user equipment (UE) configured for supporting positioning, comprising:
an external interface for receiving and sending messages;
at least one memory; and
at least one processor coupled to the external interface and the at least one memory, the at least one processor configured to:
receive, at the UE, at least one reference signal resource configuration for transmitting reference signals for positioning;
attempt to transmit, from the UE, one or more of the reference signals for positioning to one or more transmission-reception points based on the at least one reference signal resource configuration;
detect, at the UE, that the attempt to transmit the one or more of the reference signals was not in accordance with the at least one reference signal resource configuration; and
transmit, from the UE, a reference signal transmission report to a network entity, the reference signal transmission report indicating that one or more of the reference signals attempted to be transmitted from the UE were not transmitted from the UE according to the at least one reference signal resource configuration, and indicating reasons that the one or more of the reference signals were not transmitted with the at least one reference signal resource configuration, wherein the indicated reasons comprise one or more of:
the UE was unable to transmit the one or more of the reference signals;
the one or more of the reference signals were transmitted with lower power than configured by the at least one reference signal resource configuration;

the one or more of the reference signals were transmitted on a different beam than configured by the at least one reference signal resource configuration; or any combination thereof.

11. The UE of claim 10, wherein the reasons that the one or more of the reference signals were not transmitted with the at least one reference signal resource configuration comprise one or more of:
   unable to transmit due to a serving Cell change;
   unable to transmit due to a first collision with a downlink symbol;
   unable to transmit due to a second collision with a first other uplink physical (PHY) channel;
   unable to transmit due to the at least one reference signal resource configuration being outside an active bandwidth part;
   unable to transmit due to a third collision with uplink or downlink radio frequency retuning time;
   the one or more of the reference signals were transmitted with a first lower power than configured by the at least one reference signal resource configuration due to at least one of Carrier Aggregation Power limitations, Dual Connectivity (DC), or Maximum Permissible Exposure (MPE);
   the one or more of the reference signals were transmitted using a first spatial relation different than configured by the at least one reference signal resource configuration due to a fourth collision of a configured spatial relation with one of a higher priority channel;
   unable to transmit due to being in a discontinuous reception (DRX) mode;
   the one or more of the reference signals were transmitted with a second lower power than configured by the at least one reference signal resource configuration due to a low battery state associated with the UE; or
   any combination thereof.

12. The UE of claim 11, wherein the reference signal transmission report further indicates one or more of:
   a slot ID, a subframe ID, or a frame ID that contains the one or more of the reference signals;
   a resource ID or resource set ID of the one or more of the reference signals;
   a first reference ID of a first downlink signal configured for a second spatial relation between a first reference signal from a first transmission-reception point and one or more of the reference signals configured with the at least one reference signal resource configuration in response to the one or more of the reference signals not being transmitted according to a spatial relation configuration of the at least one reference signal resource configuration;
   a spatial relation information associated with the one or more of the reference signals in response to the one or more of the reference signals being transmitted using a different spatial relation than configured by the at least one reference signal resource configuration;
   a second reference ID of a second downlink signal configured for path loss determination between a second reference signal from a second transmission-reception point and one or more of the reference signals configured with the at least one reference signal resource configuration;
   a symbol or a group of symbols of the one or more of the reference signals;
   a type of a first uplink channel affected in response to the one or more of the reference signals not being transmitted due to a fifth collision with a second other uplink PHY channel;
   whether a second uplink channel affected is periodic, semi-persistent, or aperiodic in response to the one or more of the reference signals not being transmitted due to a sixth collision with a third other uplink PHY channel;
   a DRX configuration of the UE; or
   any combination thereof.

13. The UE of claim 10, wherein the at least one processor is further configured to:
   receive a second at least one reference signal resource configuration for transmitting reference signals after the transmission of the reference signal transmission report.

14. The UE of claim 10, wherein, to receive the at least one reference signal resource configuration, the at least one processor is configured to receive the at least one reference signal resource configuration from a location server.

15. The UE of claim 10, wherein, to receive the at least one reference signal resource configuration, the at least one processor is configured to receive the at least one reference signal resource configuration from a serving cell.

16. The UE of claim 15, wherein the serving cell comprises one of the one or more transmission-reception points.

17. The UE of claim 10, wherein the reference signals comprise sounding reference signals (SRS).

18. The UE of claim 10, wherein the network entity comprises one of a location server, a base station, or a transmission-reception point.

19. A user equipment (UE) configured for supporting positioning, comprising:
   means for receiving, at the UE, at least one reference signal resource configuration for transmitting reference signals for positioning;
   means for attempting to transmit, from the UE, one or more of the reference signals for positioning to one or more transmission-reception points based on the at least one reference signal resource configuration;
   means for detecting, at the UE, that the attempt to transmit the one or more of the reference signals was not in accordance with the at least one reference signal resource configuration; and
   means for transmitting, from the UE, a reference signal transmission report to a network entity, the reference signal transmission report indicating that one or more of the reference signals attempted to be transmitted from the UE were not transmitted from the UE according to the at least one reference signal resource configuration, and indicating reasons that the one or more of the reference signals were not transmitted with the at least one reference signal resource configuration, wherein the indicated reasons comprise one or more of:
   the UE was unable to transmit the one or more of the reference signals;
   the one or more of the reference signals were transmitted with lower power than configured by the at least one reference signal resource configuration;
   the one or more of the reference signals were transmitted on a different beam than configured by the at least one reference signal resource configuration; or
   any combination thereof.

20. The UE of claim 19, wherein the reasons that the one or more of the reference signals were not transmitted with the at least one reference signal resource configuration comprise one or more of:
  unable to transmit due to a serving Cell change;
  unable to transmit due to a first collision with a downlink symbol;
  unable to transmit due to a second collision with a first other uplink physical (PHY) channel;
  unable to transmit due to the at least one reference signal resource configuration being outside an active bandwidth part;
  unable to transmit due to a third collision with uplink or downlink radio frequency retuning time;
  the one or more of the reference signals were transmitted with a first lower power than configured by the at least one reference signal resource configuration due to at least one of Carrier Aggregation Power limitations, Dual Connectivity (DC), or Maximum Permissible Exposure (MPE);
  the one or more of the reference signals were transmitted using a first spatial relation different than configured by the at least one reference signal resource configuration due to a fourth collision of a configured spatial relation with one of a higher priority channel;
  unable to transmit due to being in a discontinuous reception (DRX) mode;
  the one or more of the reference signals were transmitted with a second lower power than configured by the at least one reference signal resource configuration due to a low battery state associated with the UE; or
  any combination thereof.

21. The UE of claim 20, wherein the reference signal transmission report further indicates one or more of:
  a slot ID, a subframe ID, or a frame ID that contains the one or more of the reference signals;
  a resource ID or resource set ID of the one or more of the reference signals;
  a first reference ID of a first downlink signal configured for a second spatial relation between a first reference signal from a first transmission-reception point and one or more of the reference signals configured with the at least one reference signal resource configuration in response to the one or more of the reference signals not being transmitted according to a spatial relation configuration of the at least one reference signal resource configuration;
  a spatial relation information associated with the one or more of the reference signals in response to the one or more of the reference signals being transmitted using a different spatial relation than configured by the at least one reference signal resource configuration;
  a second reference ID of a second downlink signal configured for path loss determination between a second reference signal from a second transmission-reception point and one or more of the reference signals configured with the at least one reference signal resource configuration;
  a symbol or a group of symbols of the one or more of the reference signals;
  a type of a first uplink channel affected in response to the one or more of the reference signals not being transmitted due to a fifth collision with a second other uplink PHY channel;
  whether a second uplink channel affected is periodic, semi-persistent, or aperiodic in response to the one or more of the reference signals not being transmitted due to a sixth collision with a third other uplink PHY channel;
  a DRX configuration of the UE; or
  any combination thereof.

22. The UE of claim 19, wherein the network entity comprises one of a first location server, a base station, or a transmission-reception point, and wherein the means for receiving the at least one reference signal resource configuration comprises means for receiving the at least one reference signal resource configuration from a second location server or from a serving cell, wherein the serving cell comprises one of the one or more transmission-reception points.

23. The UE of claim 19, wherein the reference signals comprise sounding reference signals (SRS).

24. A non-transitory storage medium including program code stored thereon, the program code configures at least one processor in a user equipment (UE) for supporting positioning, comprising:
  program code to receive, at the UE, at least one reference signal resource configuration for transmitting reference signals for positioning;
  program code to attempt to transmit, from the UE, the reference signals for positioning to one or more transmission-reception points based on the at least one reference signal resource configuration;
  program code to detect, at the UE, that the attempt to transmit the one or more of the reference signals was not in accordance with the at least one reference signal resource configuration; and
  program code to transmit, from the UE, a reference signal transmission report to a network entity, the reference signal transmission report indicating that one or more of the reference signals attempted to be transmitted from the UE were not transmitted from the UE according to the at least one reference signal resource configuration, and indicating reasons that the one or more of the reference signals were not transmitted with the at least one reference signal resource configuration, wherein the indicated reasons comprise one or more of:
  the UE was unable to transmit the one or more of the reference signals;
  the one or more of the reference signals were transmitted with lower power than configured by the at least one reference signal resource configuration;
  the one or more of the reference signals were transmitted on a different beam than configured by the at least one reference signal resource configuration; or
  any combination thereof.

* * * * *